(12) United States Patent
Lepine et al.

(10) Patent No.: US 7,100,455 B2
(45) Date of Patent: Sep. 5, 2006

(54) SYSTEM AND METHOD FOR PRESSURE MEASUREMENT

(75) Inventors: David F. Lepine, Watertown, CT (US); Yoshikazu Kaneko, Chikuma (JP)

(73) Assignee: Dresser-Nagano, Inc., Addison, TX (US)

( * ) Notice: Subject to any disclaimer, the term of this patent is extended or adjusted under 35 U.S.C. 154(b) by 0 days.

(21) Appl. No.: 10/928,645

(22) Filed: Aug. 27, 2004

(65) Prior Publication Data

US 2006/0042395 A1 Mar. 2, 2006

(51) Int. Cl.
*G01L 9/00* (2006.01)
*G01R 27/08* (2006.01)
*G01R 27/26* (2006.01)

(52) U.S. Cl. ............... 73/753; 324/714; 324/670
(58) Field of Classification Search .......... 324/714, 324/670; 73/753

See application file for complete search history.

(56) References Cited

U.S. PATENT DOCUMENTS

| | | | |
|---|---|---|---|
| 4,190,804 A | 2/1980 | Pyne et al. | |
| RE31,416 E * | 10/1983 | Olsen et al. | 73/862.59 |
| 4,557,225 A | 12/1985 | Sagues et al. | |
| RE33,028 E * | 8/1989 | Simpson | 137/82 |
| 4,986,131 A | 1/1991 | Sugiyama et al. | |
| 5,535,629 A | 7/1996 | Gerdes et al. | |
| 5,554,809 A | 9/1996 | Tobita et al. | |
| 5,621,398 A | 4/1997 | Blair et al. | |
| 5,770,802 A | 6/1998 | Berthold et al. | |
| 5,880,372 A | 3/1999 | Nasiri | |
| 6,070,469 A | 6/2000 | Taniguchi et al. | |
| 6,105,437 A | 8/2000 | Klug et al. | |
| 6,176,137 B1 | 1/2001 | Sasaki et al. | |
| 6,227,055 B1 | 5/2001 | Pitzer | |
| 6,390,781 B1 | 5/2002 | McDonough | |
| 6,437,581 B1 | 8/2002 | Blossfeld | |
| 6,457,368 B1 | 10/2002 | Sasaki et al. | |
| 6,932,055 B1 * | 8/2005 | Rado | 123/352 |
| 2002/0062697 A1 | 5/2002 | Yamagishi et al. | |
| 2003/0121318 A1 | 7/2003 | Bell et al. | |
| 2005/0145035 A1 | 7/2005 | Kopp | |

FOREIGN PATENT DOCUMENTS

EP 0 533 389 A2 3/1993

(Continued)

OTHER PUBLICATIONS

William Stephen Kosh, et al., U.S. Appl. No. 10/928,644, "System and Method for Pressure Measurement", filed on Aug. 27, 2004, pp. 56.

(Continued)

*Primary Examiner*—Edward Lefkowitz
*Assistant Examiner*—George P Bonanto
(74) *Attorney, Agent, or Firm*—Fish & Richardson P.C.

(57) ABSTRACT

A system and method for pressure measurement may include the ability to readily produce a pressure measurement system. In one general aspect, pressure measurement may include a signal-converting circuit that includes a coupler, a signal biaser, and a signal span adjuster. The coupler is operable to receive a pressure-representative signal, and the signal biaser includes a thermally-insensitive voltage divider that facilitates biasing the pressure-representative signal. The signal span adjuster is coupled to the coupler and the signal biaser and includes a thermally-insensitive voltage divider that facilitates adjusting the span of the pressure-representative signal.

22 Claims, 11 Drawing Sheets

FOREIGN PATENT DOCUMENTS

| | | |
|---|---|---|
| EP | 0 919 821 A1 | 6/1999 |
| EP | 1 369 675 A2 | 12/2003 |
| EP | 1 369 675 A3 | 2/2005 |
| JP | H06-078836 | 11/1994 |
| JP | 08-292118 | 11/1996 |
| JP | 2001-208633 | 8/2001 |
| JP | 3440629 B | 6/2003 |

OTHER PUBLICATIONS

International Search Report, PCT/US2005/030385, Dec. 21, 2005, pp. 1-4.

International Search Report, PCT/US2005/030252, Dec. 14, 2005, pp. 1-3.

* cited by examiner

SYSTEM AND METHOD FOR PRESSURE MEASUREMENT

TECHNICAL FIELD

This invention relates to process management and, more particularly, to pressure measurement.

BACKGROUND

Pressure sensors are commonly used in a wide variety of commercial and industrial applications. Because of their wide range of application, pressure sensors operate in a wide variety of environments and with a wide variety of other components. The operational environments and components may place various operational constraints on a pressure sensor. For example, a pressure sensor may be need to interface with a process in a particular manner (e.g., by threads of a certain depth and pitch), operate in a certain pressure range (e.g., 0–100 psi, 0–1,000 psi, or 0–10,000 psi), and/or provide a certain type of output (e.g., 0.5–4.5 V ratiometric, 0.5–4.5 V non-ratiometric, x-y voltage, or 4–20 mA).

Unfortunately, producing a pressure sensor that can operate across a variety of operational constraints has proved difficult, due to size, space, heat, and/or monetary constraints. Thus, pressure sensors are commonly manufactured when most, if not all, of the operational constraints for an application are known.

SUMMARY

A system and method for pressure measurement may provide a pressure measurement system that is adaptable to a variety of operating constraints. In one general aspect, a system for pressure measurement includes a signal-converting circuit that includes a coupler, a signal biaser, and a signal span adjuster. The coupler is operable to receive a pressure-representative signal, and the signal biaser includes a thermally-insensitive voltage divider that facilitates biasing the pressure-representative signal. The signal span adjuster is coupled to the coupler and the signal biaser and includes a thermally-insensitive voltage divider that facilitates adjusting the span of the pressure-representative signal. A thermally-insensitive voltage divider may include a thermally-matched resistive divider.

The circuit may also include a signal format converter coupled to the signal span adjuster. The signal format converter may be operable to transform the format of the pressure-representative signal to another format. For example, the signal format converter may transform a voltage signal to a current signal.

The circuit may additionally include a power reducer and a power regulator. The power reducer may be operable to reduce the power of a supply power, and the power regulator is coupled to the power reducer and may be operable to generate a regulated supply power. The power regulator may also be coupled to the signal biaser and the signal span adjuster to provide the regulated supply power thereto. Furthermore, the power regulator may be coupled to the coupler, and the coupler may be operable to convey the regulated supply power outside of the circuit. The circuit may further include a second coupler. The second coupler may be coupled to the power reducer and the signal adjuster and be operable to receive the supply power and to convey the converted pressure-representative signal. The power reducer may include a transistor operable to absorb power, and the transistor may be biased on until the input to the power regulator is less than a predefined value above the regulated supply power.

In particular implementations, the signal biaser may be operable to change the applied bias. Also, the signal span adjuster may be operable to change the applied signal span adjustment. The signal span adjuster may operate as a normal amplifier in one mode and a differential amplifier in another mode.

In another general aspect, a process for pressure measurement may include receiving a pressure-representative signal, biasing the pressure-representative signal using a thermally-insensitive voltage divider, adjusting the span of the pressure-representative signal using a thermally-insensitive voltage divider, and conveying the converted pressure-representative signal. Biasing the pressure-representative signal using a thermally-insensitive voltage divider may include using a thermally-matched resistive divider.

The process may also include converting the format of the pressure-representative signal to another format. Additionally, the process may include receiving a supply power, reducing the power of the supply power, and generating a regulated supply power based on the reduced supply power. Reducing the supply power may include biasing a power-absorbing transistor until an input to a power regulator generating the regulated supply power is less than a predefined value above the regulated supply power.

The process may additionally include selectively changing the applied signal bias. Also, the process may include selectively changing the applied signal span adjustment. Adjusting the signal span may be accomplished by a normal amplifier in one mode and a differential amplifier in another mode.

In a particular general aspect, a system for pressure measurement includes a signal-converting circuit that includes a first coupler, a power reducer, a power regulator, and a second coupler. The first coupler is operable to receive a supply power and to convey a converted pressure-representative signal. The power reducer is coupled to the first coupler and is operable to reduce the power of the supply power. To accomplish this, the power reducer includes a power-absorbing transistor that is biased on until the input to the power regulator is less than a predefined value above the output of the power regulator. The power regulator is coupled to the power reducer and is operable to generate a regulated supply power as the output. The system also includes a second coupler, a signal biaser, a signal span adjuster, and a signal format converter. The second coupler is coupled to the power regulator to receive the regulated supply power. The second coupler is operable to convey the regulated supply power outside the circuit and to receive a pressure-representative signal. The signal biaser is coupled to the power regulator to receive the regulated supply power and includes a thermally-matched resistive divider that facilitates biasing the pressure-representative signal. The signal biaser is also operable to change the applied bias. The signal span adjuster is coupled to the second coupler, to receive the pressure-representative signal, the power regulator, to receive the regulated supply power, and the signal biaser. The signal span adjuster includes a thermally-matched resistive divider that facilitates adjusting the span of the pressure-representative signal and is operable to change the applied signal span adjustment. The signal span adjuster operates as a normal amplifier in one mode and a differential amplifier in another mode. The signal format converter is coupled to the power regulator, to receive the regulated supply power, the signal span adjuster, and the first coupler. The signal format converter is operable to transform the format of the pressure-representative signal to another format and to convey the converted pressure-representative signal to the first coupler.

Various implementations may have a variety of features. For example, because a signal-converting circuit board can be installed after calibration of the stem/pressure detector/signal-conditioning circuit board assembly, the proper output for the system may be achieved in a timely manner. Thus, a pressure measurement system may be readily assembled after the appropriate signal output is determined. As another example, because a signal-converting circuit board may support one of a variety of outputs and a stem may be modified to provide one of a variety of process interfaces, a pressure measurement system may have an increased range of use. Thus, wasteful overproduction and inventory of pressure sensors based on anticipated need may be greatly reduced.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

A system and method for pressure measurement may provide a pressure measurement system that is able to generate an electrical signal representative of detected pressure. In particular implementations, a system and method may allow a signal-converting circuit to be installed after a pressure detector and a signal-conditioning circuit have been compensated without materially affecting the compensation. Thus, the signal output of the eventual pressure measurement system may be unspecified during compensation, and yet, the pressure measurement system may be readily assembled to meet operational constraints while maintaining its compensation. Other implementations, however, may have a variety of other features.

Figure 1A:
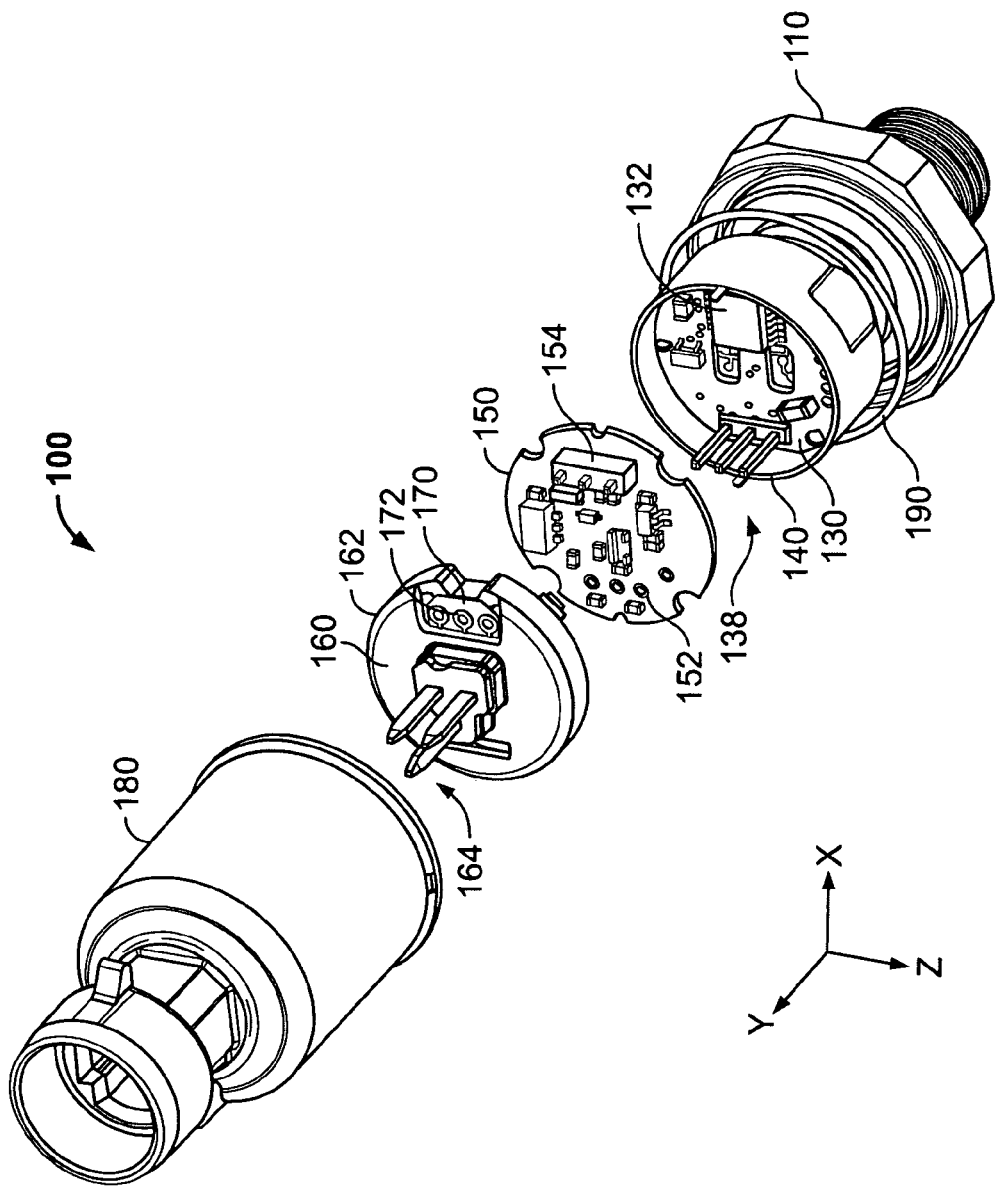
FIGS. 1A–B are an exploded view and a cross-sectional view, respectively, of an example pressure measurement system.
Figure 1B:
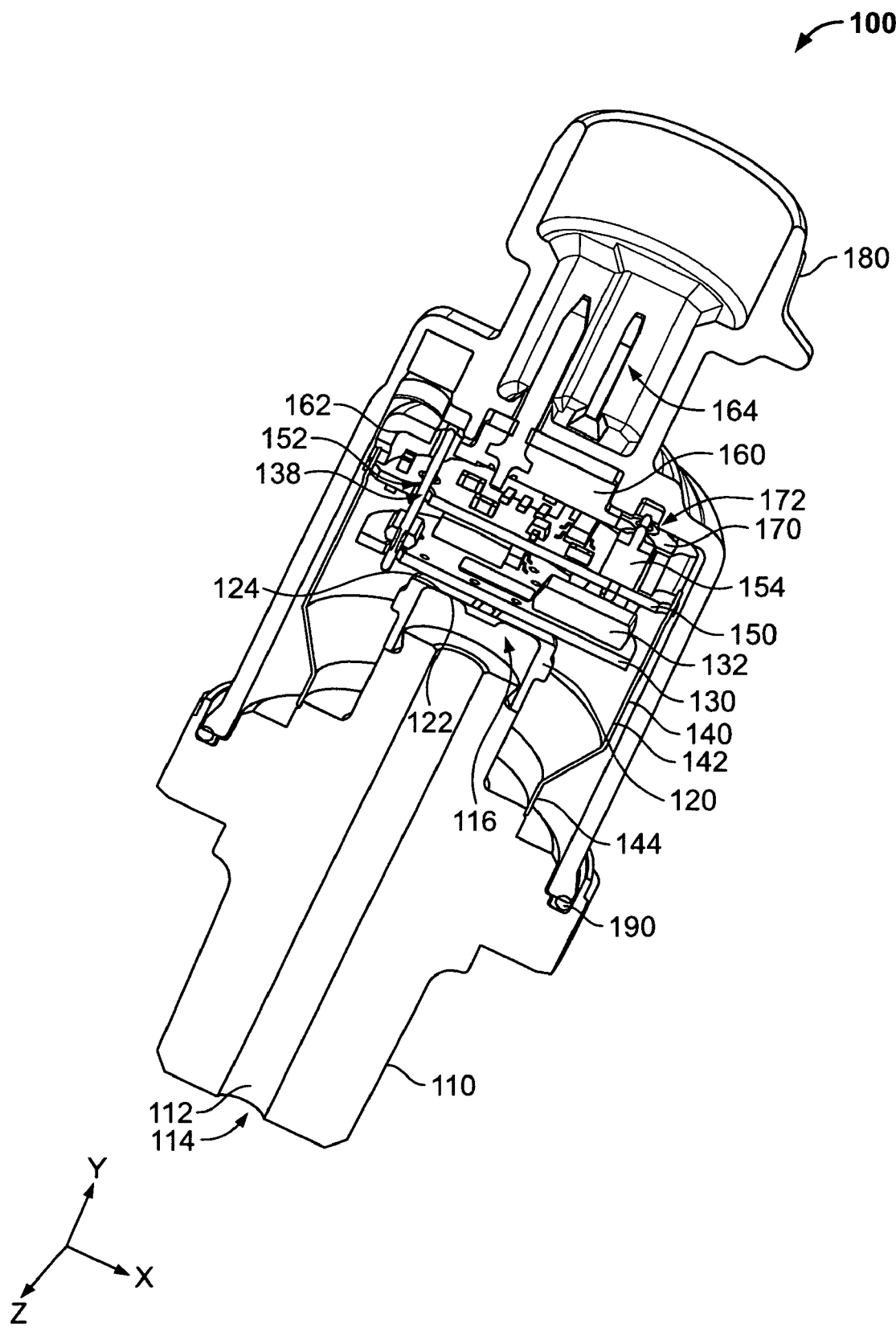

FIGS. 1A–B illustrate an example pressure measurement system 100. As illustrated, pressure measurement system 100 is a pressure sensor. Pressure measurement system 100 may measure the pressure of any appropriate fluid (e.g., liquid and/or gas).

Pressure measurement system 100 includes a pressure inlet joint 110, a pressure detector 120, and a signal-conditioning circuit board 130. Pressure inlet joint 110, which in certain implementations may be a socket, includes a stem 112 (e.g., a hex stem) defining a passage 114 that ends in a chamber 116 formed by pressure inlet joint 110 and pressure detector 120. Pressure inlet joint 110 may, for example, be composed of stainless steel having high mechanical strength and corrosion-resistance. In certain implementations, pressure inlet joint 110 may include threads for securing system 100 to a process for which pressure is to be measured. Pressure detector 120 includes a diaphragm 122 and a strain-gauge assembly 124. Diaphragm 122 may have a substantially cylindrical bottom and be a thin metallic membrane. Strain-gauge assembly 124 is coupled to a surface of diaphragm 122 opposite of the fluid-inlet side. In particular implementations, strain gauges are provided at a number of locations (e.g., four) to form a bridge circuit and output an electrical signal. The side of the diaphragm opposite the fluid side may be evacuated, sealed from the atmosphere, or vented to the atmosphere.

Pressure detector 120 is coupled (e.g., fixed and sealed) to pressure inlet joint 110 (e.g., by welding). Signal-conditioning circuit board 130 is electrically coupled (e.g., by wire bonding) to pressure detector 120 to condition signals representative of pressure that the pressure detector generates. In particular implementations, signal-conditioning circuit board 130 may include a flexible conducting strip that is bonded to pressure detector 120. Signal-conditioning circuit board 130 includes a processor 132 for conditioning (e.g., filtering, normalizing, and temperature correcting) pressure-representative signals from pressure detector 120 and a pin assembly 138 for conveying the conditioned signals. Processor 132 may be a field programmable gate array (FPGA), an application specific integrated circuit (ASIC), a microprocessor, or any other type of device for manipulating information in a logical manner. In particular implementations, processor 132 may correct for only negative linearity. In these implementations, a positive non-linearity may be added to change an apparent non-negative linearity to the processor. Varying sizes of pressure detector 120 may be used with stem 112 and signal-conditioning circuit board 130.

Pressure measurement system 100 also includes a circuit board housing 140 (e.g., a shield case) that engages signal-conditioning circuit board 130. In this implementation, circuit board housing 140 is substantially cylindrical and has a larger diameter section 142 and a smaller diameter section 144, the smaller diameter section being coupled to pressure inlet joint 110. Smaller diameter section 144 may be coupled (e.g., by resistance or laser welding) to pressure inlet joint 110 at multiple points. Larger diameter section 142 is adapted to couple to signal-conditioning circuit board 130, which will be discussed in more detail below, although not all of the circuit board or its components need to be located in the larger diameter section. In particular implementations, circuit board housing 140 may be electrically coupled to a ground line of signal-conditioning circuit board 130 to provide increased noise resistance for the circuit board.

Pressure measurement system 100 further includes a signal-converting circuit board 150, an electrical connector 160, an electrical-geometry converter 170, a system housing 180, and a sealing ring 190. Signal-converting circuit board 150 is engaged by circuit board housing 140 and includes a pin-receiving assembly 152, which electrically couples the signal-converting circuit board to signal-conditioning circuit board 130. Signal-converting circuit board 150 also includes a pin assembly 154. In particular implementations, a spacer may be inserted between circuit board 130 and circuit board 150, especially if circuit board 130 sits on or near the top of circuit board housing 140. Electrical connector 160 is also engaged by circuit board housing 140. Electrical connector 160 includes a pin assembly 164 and may include a gasket 162 for sealing to system housing 180. Electrical-geometry converter 170 includes a pin-receiving assembly 172, which electrically couples signal-converting circuit board 150 to electrical connector 160. As shown, pin assembly 164 is in the Packard configuration. Other possible configurations include Deutsch, Hirshmann, DIN Form A, and cabling. Different configurations of converter 170 may convert to these different pin configurations. Some configurations may even call for a different number of pins (e.g., two or four). Some couplings, however, may be implemented over a reduced number of pins. For instance, a four-connector coupling may be implemented using a three-connector coupling, with one of the connectors tied to ground.

Electrical-geometry converter 170 converts the geometry of pin assembly 154 to that of pin assembly 164. Converter 170 may be a flexible polyimide, such as DuPont's Kapton® Polyimide Film, with traces thereon, a circuit board, or any other object that includes electrically-conducting geometric patterns. System housing 180 is coupled to pressure inlet joint 110 (e.g., by welding, crimping, adhesive bonding, and/or caulking) and engages electrical connector 160, pin assembly 164 extending through housing 180. In particular implementations, electrical connector 160 and system housing 180 may be composed of an electrically insulating material (e.g., molded plastic). In certain implementations, electrical connector 160 may be integral with system housing 180. System housing 180, in conjunction with pressure inlet joint 110, encloses circuit board housing 140. In certain implementations, housing 180 may vary depending on electrical connector 160. Sealing ring 190, which may, for example, be a gasket, an o-ring, or a sealant, interfaces with system housing 180 and pressure inlet joint 110 for preventing intrusion of moisture and dust.

During one mode of manufacture, pressure inlet joint 110 is coupled to pressure detector 120, and signal-conditioning circuit board 130 is inserted into circuit board housing 140 and engaged therewith. Circuit board housing 140 is then engaged with pressure inlet joint 110 while aligning circuit board 130 with pressure detector 120. Circuit board housing 140 is coupled to pressure inlet joint 110, and circuit board 130 is electrically coupled to pressure detector 120. The assembly of the pressure inlet joint, the pressure detector, the signal-converting circuit board, and the circuit board housing is then compensated for a predetermined pressure range and/or temperature range. For example, the assembly may be calibrated (e.g., so that the output from the signal-conditioning circuit board is linear from minimum output to maximum output) and temperature corrected (e.g., so that errors due to applied temperature change are reduced).

The assembly may then be finished into a pressure measurement system or stored for later finishing. Finishing may, for example, occur when the appropriate output signal for the pressure measurement system that will include the assembly is determined. When it is time to finish the pressure measurement system, signal-converting circuit board 150, which may be one of many types of signal-converting circuit boards appropriate for use with the assembly, is engaged with circuit board housing 140 and electrically coupled with signal-conditioning circuit board 130, through pin assembly 138 and pin receiving assembly 152 in the illustrated implementation. Electrical connector 160 is then engaged with circuit board housing 140 and electrically coupled with signal-converting circuit board 150, through pin assembly 154 and electrical-geometry converter 170 in the illustrated implementation. Housing 180 is then engaged with electrical connector 160 and coupled to pressure inlet joint 110, engaging sealing ring 190 in the process.

Although one mode of manufacturing system 100 has just been described, it should be recognized that fewer, additional, and/or a different arrangement of operations may be used in other modes of manufacture. For example, the pressure inlet joint may be a blank when assembled with the pressure detector and the signal-conditioning circuit board. Later, when the process application for the pressure measurement system is determined, the pressure inlet joint may be appropriately machined to interface with the process. Also, the initial assembly may include only the stem portion of a pressure inlet joint, and the stem may be coupled to an appropriate socket during finishing. Coupling the stem to a socket may be accomplished by laser welding or gas-tungsten arc welding. In certain implementations, these techniques allow any style pressure inlet joint may be achieved, as long as it is less than a certain size (e.g., 1.06 inches (27 mm)). As another example, the signal-conditioning circuit board may already condition the signal for an appropriate type of output (e.g., 0.5–4.5 Vdc ratiometric). Thus, if that type of output is determined to be the appropriate one for the eventual pressure measurement system, no signal-converting circuit board is required. In this situation, the signal-conditioning circuit board may not be used, and electrical connector 160 may be rotated 180° and electrically coupled (e.g., soldered) to pin assembly 138.

In one mode of operation, pressure inlet joint 110 is coupled (e.g., screwed and sealed) to a process for which a pressure is to be measured and allows a pressure of a fluid to enter passage 114 and arrive at chamber 116. Based on the pressure in chamber 116, diaphragm 122 deforms, and strain gauge 124 senses the pressure as a strain and converts the pressure to an electrical signal, which is conveyed to signal-conditioning circuit board 130. Signal-conditioning circuit board 130 conditions (e.g., filters, amplifies, and linearizes) the electrical signal. The conditioned signal may be a nominal signal (e.g., 0–1 V) that may be capable of being converted to various output signals. The conditioned signal is then conveyed to signal-converting circuit board 150, which converts the conditioned signal to the appropriate output signal (e.g., 0.5–4.5 V ratiometric, 0.5–4.5 V non-ratiometric, x-y voltage, or 4–20 mA). Signal-converting circuit board 150 may support one or more output signal types. The output signal is conveyed to electrical connector 160, which conveys the signal outside of system housing 180, so that the signal may be provided to a remote device.

System 100 has a variety of features. For example, because signal-converting circuit board 150 can be installed after compensation of the stem/pressure detector/signal-conditioning circuit board assembly, the proper output for the system may be achieved in a timely manner. For instance, it commonly takes between twelve to twenty-four hours to (batch) compensate a pressure sensor with a specified output. An assembly of system 100, however, may be pre-compensated and then readily assembled when the proper output is determined. Also, the compensation is simplified because the assembly only includes a few components during compensation, which may provide consistent interfaces. Moreover, further compensation may be avoided while still achieving stringent commercial and industrial specifications. For example, in particular implementations, changes to output values may be less than 0.40% of the input/output range within a temperature range of −20–85° C. In certain implementations, the changes may be less than 0.1%. As another example, because signal-converting circuit board 150 may support one of a variety of outputs, system 100 has increased a range of use. Thus, wasteful overproduction and inventory of pressure sensors based on anticipated need may be greatly reduced. Moreover, because electrical connector 160 has three pins in pin assembly 164, signal-converting circuit board 150 may provide outputs for this pin configuration, which provides efficiency. As an additional example, electrical connector 160 is able to provide appropriate output for a variety of output types (e.g., three wire and two wire). For instance, for a three-wire output, two of the wires may be used for power and the other wire may be used for data, with the data signal referenced to the lower-power line, and for a two-wire output, a signal may be imposed on the same two wires as the supply power, as a current (i.e., 4–20 mA) signal or a digital data K-Line CAN bus, for example. Four-wire systems may require a different signal connector configuration. As a further example, electrical connector 160 may be readily exchanged for an electrical connector that has another pin configuration (e.g., Packard to Hirshmann). Thus, a specified output coupler type can readily be achieved. As another example, because signal-conditioning circuit board has a consistent output interface, one type of data acquisition system may be used for compensation, to a reduction in process variability, equipment cost, complexity, and training for and servicing of the compensation system.

Figure 2A:
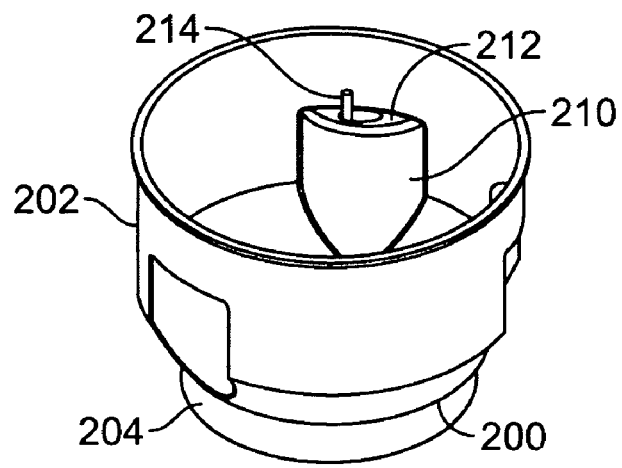
FIGS. 2A–B are a perspective view and a side cross-sectional view, respectively, of an example circuit board housing for the system in FIG. 1.
Figure 2B:
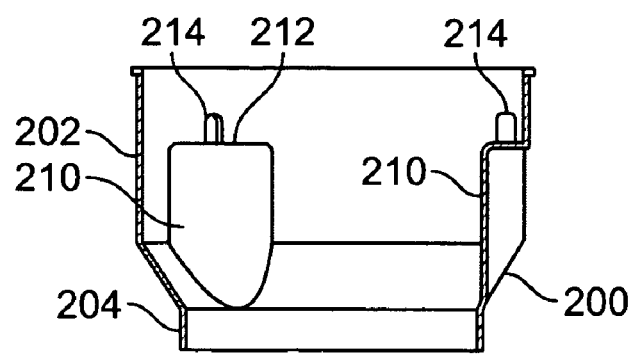

FIGS. 2A–B illustrate an example of circuit board housing 140—circuit board housing 200. Circuit board housing 200 includes a larger diameter section 202 and a smaller diameter section 204. Circuit board housing 200 may be composed of tin-plated soft steel, stainless steel, which may be matched to the pressure inlet joint, soft steel that may be readily formed, copper-based metal having good electrical characteristics, or any other appropriate material. In particular implementations, the material may have EMI/RFI-shielding properties. Smaller diameter section 204 may engage a pressure inlet joint and be coupled thereto at a number of points (e.g., by spot welding).

Circuit board housing 200 also includes three column sections 210. Column sections 210 have a substantially semi-circular cross section and extend from smaller diameter section 204 toward larger diameter section 202. The column sections are substantially parallel to the longitudinal axis of the circuit board housing. In other implementations, column sections 210 may have any other appropriate shapes and/or orientations. Each of column sections 210 includes a cover 212, which each includes a projection 214. Covers 212 can support a circuit board, and one or more of projections 214 may be coupled to the circuit board. Also, one or more of projections 214 may be electrically coupled to a ground line for the circuit board. The electrically coupled projections may provide part of an electrical path from the circuit board to the pressure inlet joint. In particular implementations, the circuit board housing may be part of the path, and the ground line may be coupled to the projection via a capacitor and/or a varistor so that an AC component superimposed on a DC supply power line can be released to the earth. This path may assist in reducing noise for the circuit board. In particular implementations, the projections are arranged at unequal intervals around the housing.

In one mode of operation, a circuit board is installed and supported on covers 212. The circuit board is then coupled to projections 214. When fixing projections 214 to the circuit board, the projections may be pressed against ground pads on the circuit board and bent thereon for engagement. In certain implementations, however, joint by soldering is preferable because of increased reliability. Circuit board housing 200 is then coupled to a pressure inlet joint.

Although FIGS. 2A–2B illustrate one implementation of a circuit board housing, other implementations may have fewer, additional, and/or a different arrangement of components. For example, a circuit board housing may engage a second circuit board. Also, a circuit board housing need not have a varying diameter. Moreover, the cross-section of a circuit board housing need not be circular.

Figure 3:
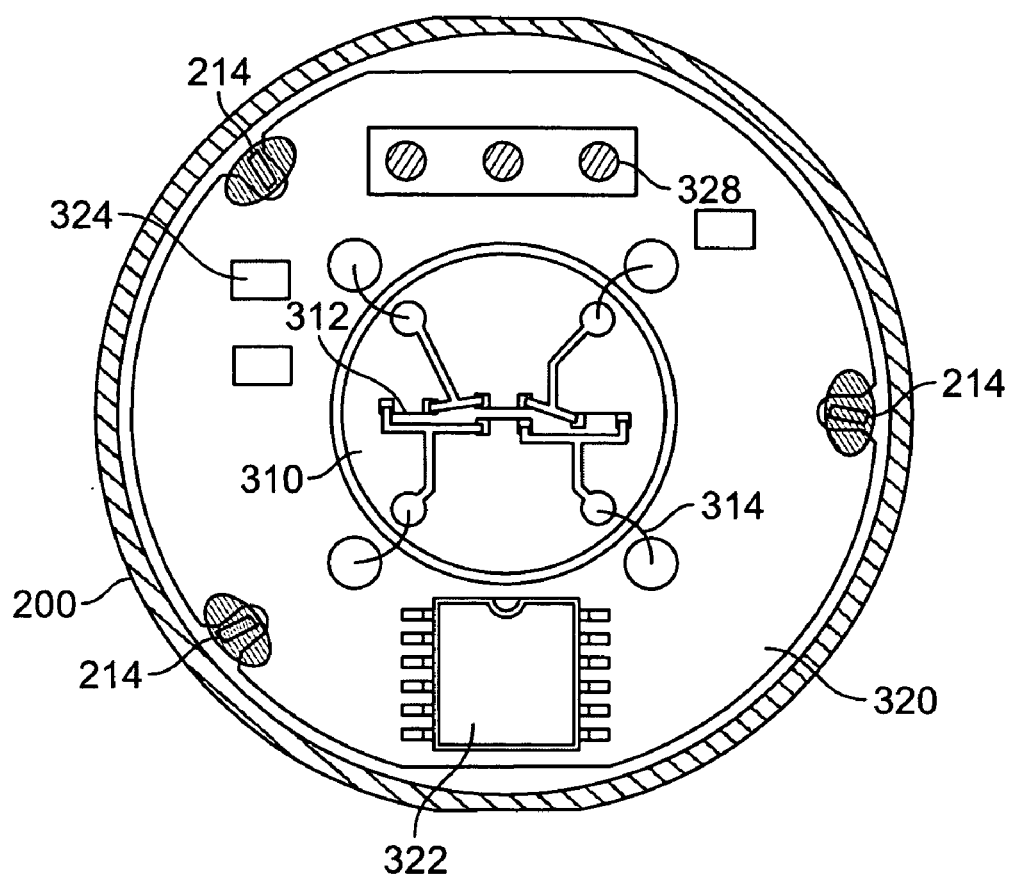
FIG. 3 is a top cross-sectional view showing an example of the circuit board housing in FIGS. 2A–B in relationship to a pressure detector and a signal-conditioning circuit board.

FIG. 3 illustrates circuit board housing 200 engaged with a pressure detector 310 and a circuit board 320, which may be similar to pressure detector 120 and signal-conditioning circuit board 130, respectively, of system 100. As illustrated, circuit board 320 is coupled to circuit board housing 200 by projections 214, and electrodes of a strain gauge arrangement 312 of pressure detector 310 are electrically coupled to electrodes of circuit board 320 by wire bonding 314. Although the pressure detector is directly connected to the circuit board by wire bonding in the illustrated implementation, a configuration may be employed in which the pressure detector is connected via a lead frame to the circuit board.

Circuit board 320 also includes a processor 322, a capacitor 324, and an input/output assembly 328. In operation, an electrical signal that is generated by pressure detector 310 is conditioned (e.g., amplified, filtered, and linearized) by circuit board 320. Processor 322 may assist in the conditioning. The conditioned signal is provided to input/output assembly 328, from which the signal may be sent via a relay board to an electrical connector for an external device. Input/output assembly 328 may serve as the basis for a variety of electrical outputs (e.g., 0.5–4.5 V ratiometric, 0–5 V non-ratiometric, x-y Vdc, or 4–20 mA).

Circuit board housing 200 has a variety of features. For example, when the circuit board is tightly coupled to the circuit board housing (e.g., by soldering), and the circuit board housing is tightly coupled to a pressure inlet joint with a pressure detector fixed thereon, a fixed portion of the circuit board is less susceptible to breaking. This allows a pressure measurement system with high reliability to be obtained. As another example, a ground terminal of the circuit board may be electrically coupled to a pressure inlet joint, which allows an improvement in noise resistance. Also, this electrical coupling may be realized by soldering and welding, increasing the reliability of the coupling and reducing structural changes that may occur during the passage of time, which allows the noise resistance property to be maintained for a longer period of time. As an additional example, by fixing the circuit board housing to a pressure inlet joint by spot welding, an improvement in strength may be obtained. This increases reliability by providing a pressure measurement system capable of maintaining performance even in an environment in which vibration or impacts may occur. As a further example, the area for mounting components on the rear surface of the circuit board is increased because the circuit board is coupled to the circuit board housing in the larger diameter section and the housing does not support the circuit board around its entire periphery. Also, when the component mounting area is secured, a diameter of the circuit board does not have to increase, and, as a result, the diameter of the pressure sensor does not have to increase. Further, by managing the height of covers 212 (FIG. 2A), the height of the circuit board can readily be managed.

As another example, since column sections 210 (FIG. 2A) are arranged in parallel to the longitudinal axis of the circuit board housing from the smaller diameter section to the larger diameter section, fabrication by press working can readily be performed. Namely, press working in the lateral direction in addition to processing in the vertical direction may be avoided. This may allow not only a less complicated structure of a die, but also easier die maintenance and increased press working speed, not to mention increased construction consistency. The pressing direction can be realized in the longitudinal direction also in the case of the projections, so that the pressure measurement system can be readily manufactured. Easing processing operations results in the circuit board housing being produced as a low cost member.

As an additional example, the circuit board is coupled to the pressure inlet joint through a circuit board housing, which may be securely coupled to the pressure inlet joint. This may provide proper positioning of the circuit board, especially in the rotational direction, and a more lasting coupling, especially in high static or dynamic heat and/or load environments. If the circuit board loses its coupling to the pressure inlet port, disconnection of a wire electrically coupling the circuit board to a pressure detector may occur.

As a further example, the circuit board housing may be made of a conductive material. This may improve the reliability of the circuit board housing and/or the interface between the circuit board housing and the pressure inlet joint by lessening the difference between thermal coefficients of expansion.

Figure 4:
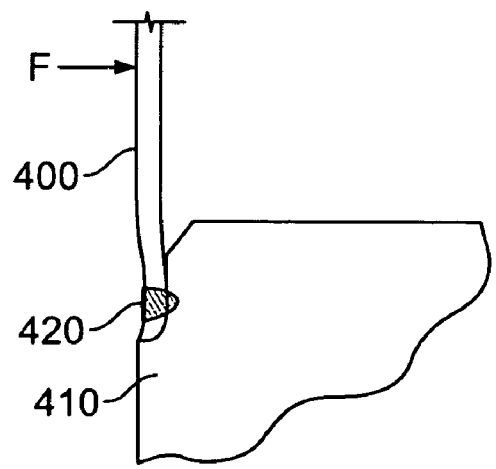
FIG. 4 is a side cross-sectional view showing a coupling between a circuit board housing and a pressure inlet joint.

FIG. 4 illustrates a technique for coupling a circuit board housing 400 and a pressure inlet joint 410. As illustrated, circuit board housing 400 and pressure inlet joint 410 are coupled to each other by using spot welding, at a number of weld sections 420 (only one of which is shown). When spot welding is performed at weld sections 420, circuit board housing 400 deforms slightly inward at the sections. Because of this feature, when a force F is applied to the circuit board housing, the section as a whole receives the force, so the stress is not concentrated at the weld section. This may result in the weld sections resisting breakage.

Figure 5:
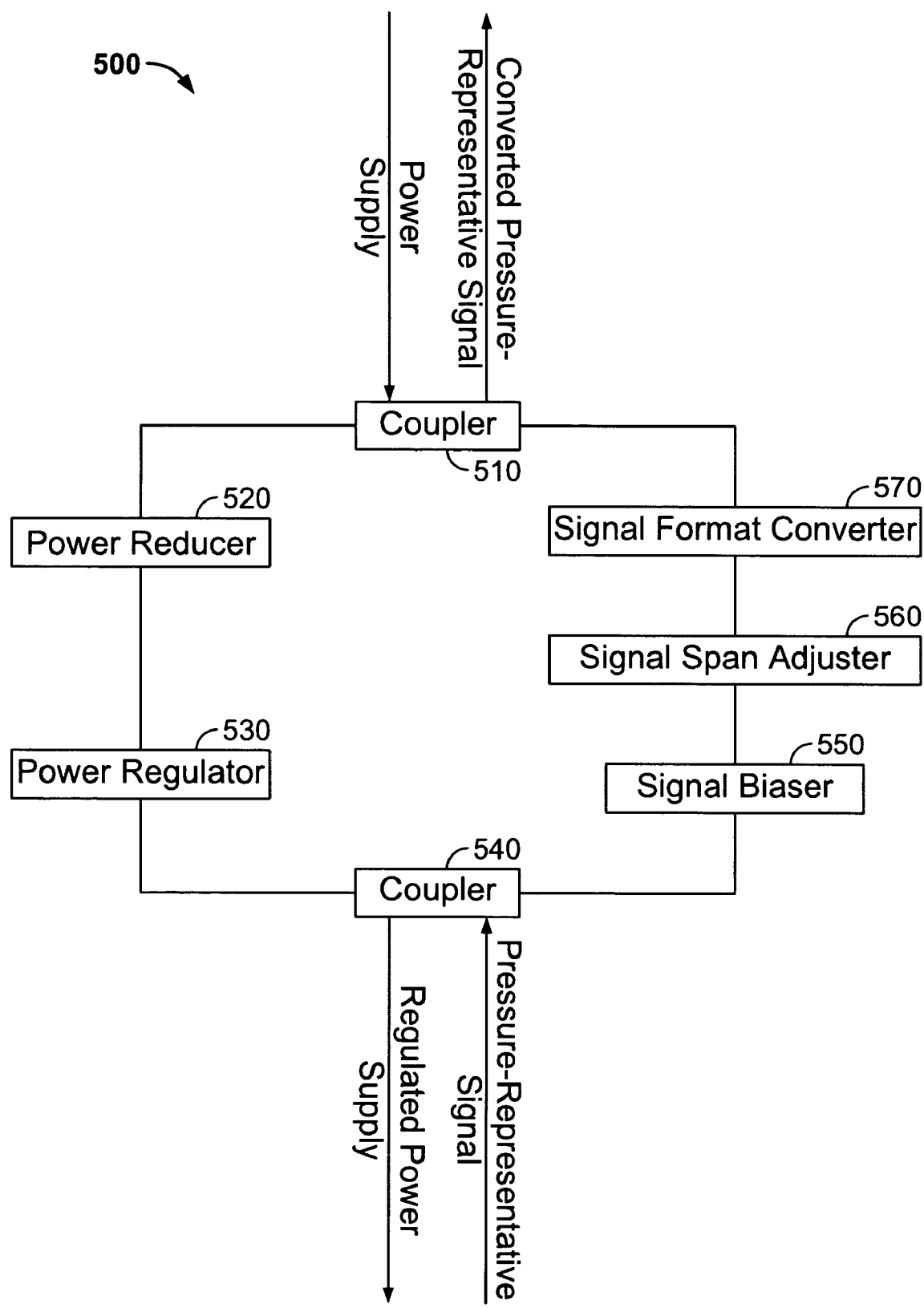
FIG. 5 is a block diagram illustrating one example of a signal-converting circuit.

FIG. 5 illustrates one example of a signal-converting circuit 500. Signal converting circuit 500 may, for example, be part of signal-converting circuit board 150 (FIGS. 1A–B).

Circuit 500 includes a coupler 510, a power reducer 520, a power regulator 530, and a coupler 540. Coupler 510 receives a supply power and conveys a converted signal that represents pressure. Coupler 510 may include one or more connectors (e.g., pins) for receiving the supply power and conveying the converted pressure-representative signal. In particular implementations, the coupler may receive the supply power from and convey the converted pressure-representative signal to an external electrical connector. Power reducer 520 limits the supply power to a specified range (e.g., 0–5 V). In particular implementations, power reducer 520 may include a transistor for absorbing power in the supply power. The limited signal is conveyed to power regulator 530, which provides a reliably regulated supply power. In particular implementations, power regulator 530 may be a voltage regulator. The regulated signal is conveyed to coupler 540. Coupler 540 may have one or more connectors (e.g., pins) for conveying the regulated supply power and receiving a pressure-representative signal. In particular implementations, the coupler may convey the regulated supply power to and receive the pressure-representative signal from a signal-conditioning circuit.

Circuit 500 also includes a signal biaser 550, a signal span adjuster 560, and a signal format converter 570. Signal biaser 550 is responsible for inserting an offset into the pressure-representative signal. For example, signal biaser 500 may add a 5 V offset to a signal. In particular implementations, the signal biaser may provide the offset through resistor dividers. Gain may then be applied to the offset pressure-representative signal by signal span adjuster 560. For example, signal span adjuster 560 may double the span of the signal (e.g., from 5 V to 10 V). In particular implementations, signal span adjuster may include an amplifier. The scaled, offset pressure-representative signal may then be converted to another format by format converter 570. For example, a voltage may be converted to a current, a frequency-variable signal, a switched-output signal, a pulse-width modulated signal, a pulse-count signal, a digital signal, a wireless signal, or any other appropriate format for conveying information. The converted pressure-representative signal is then conveyed out of circuit 500 by coupler 510.

Circuit 500 may be used to convert a pressure-representative signal of signal-conditioning circuit board 150. In particular implementations, the pressure representative signal is a 10%–90% of 5V ratiometric signal. Circuit 500 may also be used for converting signals of other systems, such as temperature measurement systems, humidity measurement systems, or any other appropriate type of transducer system. In general, circuit 500 may be used for any appropriate type of physical or electrical variable measurement system.

Although FIG. 5 illustrates one implementation of a signal-converting circuit, other implementations may include fewer, additional, and/or a different arrangement of components. For example, a signal-converting circuit may not include a power reducer and/or a power regulator, especially if the supply power is well-regulated. As another example, a signal-converting circuit may not include a signal biaser, a signal span adjuster, and/or a signal format converter, depending on the differences between the pressure-representative signal and the converted pressure-representative signal. For example, if a pressure-representative signal only needs to be biased, a circuit may not include a signal span adjuster or a signal format converter. In certain implementations, however, unneeded components may be switched off or bypassed. As a further example, the regulated supply power from power regulator 530 may be provided to other components of circuit 500, such as signal biaser 550 and signal span adjuster 560. As an additional example, various components of circuit 500 may have selectable characteristics. For example, signal biaser may be able to bias a signal by two or more amounts, and signal span adjuster may be able to scale a signal by two or more amounts.

Figure 6:
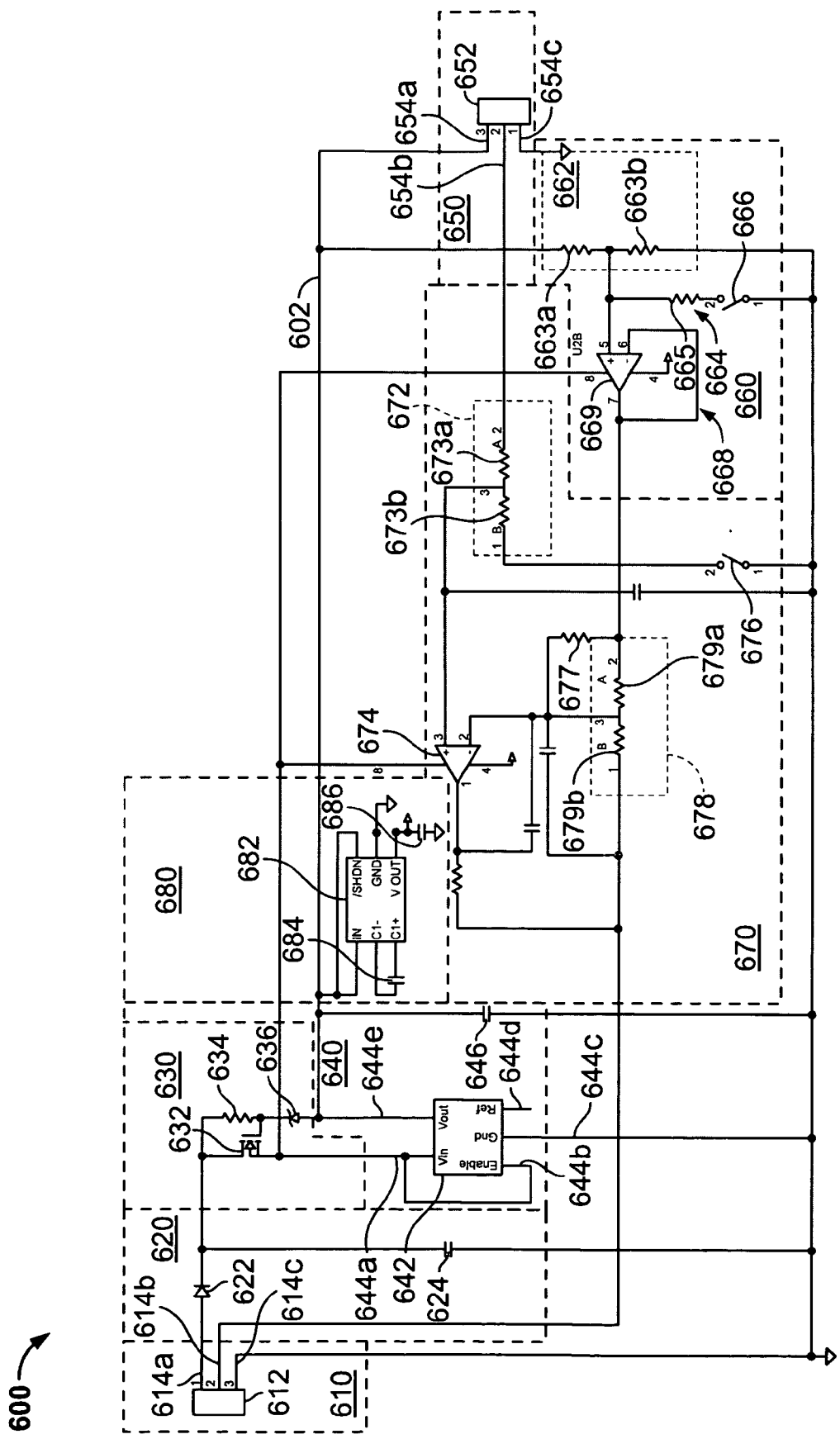
FIG. 6 is a schematic diagram showing one example of a signal-converting circuit.

FIG. 6 illustrates one example of a pressure-converting circuit 600. Circuit 600 is one implementation of pressure-converting circuit 500. Circuit 600 may be part of signal-converting circuit board 150 (FIGS. 1A–B).

In general, circuit 600 includes an input/output coupler 610, a circuit protector 620, a voltage reducer 630, a voltage regulator 640, an input/output coupler 650, a signal biaser 660, and a signal span adjuster 670. As discussed in more detail below, circuit 600 is designed to accept an unregulated voltage input from 9 to 36 Vdc, although it may operate at up to 50 Vdc under limited conditions. The circuit, however, can be readily modified to use other input voltage ranges (e.g., from 1 to 240 Vac or Vdc), with appropriate components. The circuit can also output a 0–5 Vdc signal or a 0–10 Vdc signal. In particular implementations, the circuit operates at 5 V, although other voltages (e.g., 4.096 V) are possible.

Input/output coupler 610 includes a connector 612 and conductors 614 (e.g., pins) that allow signals to be conveyed to and from circuit 600. In the illustrated implementation, an input supply voltage arrives on conductor 614a, and a common signal (e.g., ground) arrives on conductor 614c. Conductor 614b is used for conveying the converted pressure-representative signal from the circuit. As mentioned previously, the voltage through conductor 614a may be unregulated.

Circuit protector 620 is coupled to coupler 610 and protects circuit 600 from improper signals, transient spikes, noise, and the like in the input supply voltage. In the illustrated implementation, circuit protector 620 includes a diode 622 and a capacitor 624. Diode 622 polarity protects the input supply voltage, and capacitor 624 decouples the input supply voltage. In particular implementations, diode 622 is a Schottkey diode, and capacitor 624 has a capacitance of 0.1 µF.

To accommodate the voltage range of the input signal, voltage reducer 630 limits the input voltage to a predefined range (e.g., 0–5 V). The reduced voltage is conveyed to voltage regulator 640. Voltage reducer 630 includes a transistor 632, which can absorb the bulk of the voltage. In particular implementations, transistor 632 is an N-channel or a P-channel enhancement metal-oxide-semiconductor field-effect transistor (MOSFET). Voltage reducer 630 also includes a resistor 634 and a diode 636. Resistor 634 provides bias current to diode 636, which in turn biases transistor 632 on. In certain implementations, transistor 632 is biased into linear operation. Transistor 632 may be biased on by resistor 634 and diode 636 until the input to voltage regulator 640 is less than a given value (e.g., 2V) above the output of the voltage regulator. In particular implementations, diode 636 keeps the gate of transistor 632 biased at about 10 Vdc, which keeps the input to voltage regulator 640 at about 8 V. In particular implementations, resistor 632 may have a resistance of 100K Ohms, and diode 636 may be a zener diode.

Voltage regulator 640 produces a regulated supply voltage based on the supply voltage from voltage reducer 630. Voltage regulator 640 includes a regulator 642 and a capacitor 646. In the illustrated implementation, regulator 642 has five input/output connectors 644. The reduced voltage is received through connector 644a and fed back through connector 644b. The regulated supply voltage, which may be quite steady, is provided to input/output coupler 650 through connector 644e, which is coupled to a circuit rail 602. In particular implementations, regulator 640 is a precision 5 Vdc regulator able to source 5 mA, such as an LM4120 with 0.2% accuracy and low thermal drift. Capacitor 646 provides stabilization and decoupling of the output signal. Capacitor 646 may have a capacitance of 0.022 µF.

Input/output coupler 650 is coupled to voltage regulator 640 through rail 602 and includes connector 652 and conductors 654. Input/output coupler 650 provides the regulated voltage to a signal-conditioning circuit board through conductor 654a. This signal may excite that circuit board so that it may generate a signal representative of pressure. The pressure-representative signal is received through conductor 654b. In particular implementations, the pressure-representative signal is expected to be linear over 10% to 90% of the span (e.g., 0.5–4.5 V) for a 0–5 V signal.

Signal biaser 660 is also coupled to rail 602 and includes a voltage divider 662 that divides the rail to provide a reference voltage for the output stage (e.g., signal span adjuster 670). This reference voltage is ratiometric to the rail. In doing so, voltage divider 662 sets the offset for the pressure-representative signal received through connector 654b of input/output coupler 650.

In this implementation, voltage divider 662 includes thermal-coefficient-matched resistors 663. In particular implementations, resistor 663a may have a resistance of 453K Ohms, and resistor 663b may have a resistance of 90.9K Ohms. Resistors 663 may be precise (e.g., 0.1% deviation and 25 ppm thermal drift), although they need not be.

Signal biaser 660 also includes offset selector 664. Offset selector 664 allows the offset of signal biaser 660 to be selected. As illustrated, offset selector 664 includes a resistor 665 and a switch 666. In particular implementations, resistor 665 may have a resistance of 75K Ohms. When switch 666 is open, signal biaser 660 may bias the signal 2.5 V. When switch 666 is closed, resistor 665 may be viewed as part of the voltage divider 662. Closing switch 666 may set the output voltage to 0 Vdc when the input is equal to 10% of 5 V.

Signal biaser 660 additionally includes a buffer 668, which buffers the offset voltage. Buffer 668 includes an operational amplifier 669, which, in particular implementations, may be a TS27L2AID. Operational amplifier 669 acts as a voltage-follower to buffer voltage divider 662, including when the parallel value of resistor 663b is included when switch 666 is closed.

Signal span adjuster 670 is coupled to coupler 650 and receives the pressure-representative signal received through conductor 654b. Signal span adjuster 670 scales the pressure-representative signal to the appropriate range (e.g., from 5V to 10 V). In the illustrated implementation, signal span adjuster 670 acts as a differential amplifier that compares the pressure-representative signal voltage to a stable reference voltage and provides precise differential gain with a single-ended (ground referenced) output voltage.

Signal span adjuster 670 includes a voltage divider 672, an operational amplifier 674, and a switch 676. Voltage divider 672 includes thermal-coefficient-matched resistors 673. Resistors 673 may be matched by a variety of techniques. In particular implementations, each of resistors 673 has a resistance of 150K Ohms. In this simplementation, when switch 676 is open, signal span adjuster 670 behaves as a normal-mode amplifier (non-inverting, in particular), and when switch 676 is closed, signal span adjuster 670 behaves as a differential amplifier. In certain implementations, signal span adjuster 670 doubles the span of the signal.

The output of signal span adjuster 670 is fed back through another voltage divider 678, which also receives the output of buffer 668. Voltage divider 678 includes thermal-coefficient-matched resistors 679. In particular implementations, each of resistors 679 has a resistance of 150K Ohms. The thermal-coefficients of resistors 679 do not have to correspond to that of resistors 673. Voltage divider 678 forces the voltage of operational amplifier 674 to follow a non-zero voltage offset that when combined with the span adjustment, places the output at 0 V when the input is at 0.5V.

In one mode of operation, circuit 600 produces a 0–5 V output signal when switch 666 and switch 676 are closed. With the voltage signal received through conductor 654b at 0.5 Vdc, voltage divider 672, with 150K Ohm resistors, sets the non-inverting input of operational amplifier 674 to 0.250 Vdc. The output of operational amplifier 669 is a buffered voltage set by voltage divider 662 from rail 602, which is at +5 V. The buffered voltage is then 0.416 Vdc with switch 666 closed, and the parallel combination of resistor 677 and resistor 679b is 100K Ohms (i.e., (300*150)/(300+150)). For the following formulas, this will be expressed as resistor 679a'. The output formula is as follows:

$$Vout=Vin/(R673a+R673b)*R673b*(1+(R679b/R679a'))-(Voffset*(R679b/R679a')),$$

where R is the resistance of the associated resistor, and Vout is the output of operational amplifier 674. For the mentioned implementation, this translates to:

$$Vout=Vin/(150+150)*150*(1+(150/100))-(0.416*(150/100)).$$

Thus, $$Vout=0.001 \text{ Vdc with Vin}=0.5 \text{ Vdc; and}$$

$$Vout=5.001 \text{ Vdc with Vin}=4.5 \text{ Vdc}.$$

To change the circuit for a 0–10 Vdc output, switch 666 and switch 676 are opened. Opening switch 676 changes the circuit to a follower with an offset. This effectively eliminates voltage divider 672. To compensate for the change in the offset, switch 666 is also opened, which changes the buffered offset to 0.835 Vdc.

Now, the output formula may be expressed as:

$$Vout=Vin*(1+(R679b/R679a'))-(R679b/R679a')*Voffset.$$

With the mentioned implementation, this produces:

$$Vout=Vin*(1+(150/100))-(150/100)*0.835;$$

$$Vout=-0.002 \text{ Vdc, with Vin}=0.5 \text{ Vdc; and}$$

$$Vout=9.998 \text{ Vdc, with Vin}=4.5 \text{ Vdc}$$

Circuit 600, therefore, may convert a ratiometric input voltage from an external device (e.g., signal-conditioning circuit board 130) to an output of 0–5 Vdc or 0–10 Vdc.

In order for operational amplifier 674 to swing to (or through) zero volts, it may be necessary to generate a slightly negative internal supply rail. This may be achieved by voltage regulator 680. Voltage regulator 680 includes a regulator 682 and a capacitor 684, which produce the negative voltage. Regulator 682 may, for example, be a charge-pump voltage inverter. A capacitor 686 filters the resultant –5 Vdc. Capacitor 684 and capacitor 686 may each have a capacitance of 1 μF.

In particular implementations, circuit 600 may include one or more transient voltage suppressors, blocking diodes, chokes, and decoupling capacitors, to protect from mis-wiring and short circuits, provide output current limiting, block transient signal spikes, and minimize EMI, ESD, and transient noise. In particular implementations, the output voltage may be finished off with a compound transistor totem circuit that provides wider output swing, with short-circuit protection, output current limiting, mis-wiring protection, and increased capacitive drive capability.

In one mode of operation, the output received from the signal-conditioning circuit board is expected to be linear over a range (e.g., from 10% of the regulated voltage (at zero pressure) to 90% of the regulated voltage (at full-scale pressure)). Thus, with the circuit gain fixed, the span accuracy is dependent on the fixed gain of the circuit and the regulation of the voltage on rail 602. The output accuracy is determined, at least in part, by the offset of circuit 600. Thus, precision resistors may be used for setting the offset stage of the circuit. Output offset thermal performance may be determined by the thermal-coefficient matching of the offset resistors and input offsets of the operational amplifiers. Output span thermal performance may be determined by the thermal-coefficient matching of the gain resistors, as well as the thermal drift of voltage regulator 640.

In certain implementations, the regulated voltage may be matched to the nominal driver-circuit voltage in the signal-conditioning circuit. For example, if the nominal driver-circuit voltage in the signal-conditioning circuit is 5 V, the regulated voltage may be 5 Vdc. However, any other appropriate voltage may be used. For instance, using 4.096 V may provide the advantage of reducing the driver circuit's current demand, which may be important in operating at less than 4 mA for a 4–20 mA, two-wire output.

In order to maintain consistent offset and offset thermal coefficients, the tolerances and thermal-coefficients of the offset resistors may be tightly controlled, and possibly even matched. In particular implementations, matching is not necessary, so long as the tolerances are within 0.1%, and the thermal-coefficient of resistance are within 25 ppm.

In order to maintain consistent span and span thermal coefficients, the tolerance and thermal-coefficients of the gain setting resistors may be controlled. In particular implementations, resistor networks (pairs) with 50 ppm tolerances and 5 ppm matched thermal-coefficient resistors may be used.

Although one implementation of circuit 600 has been discussed, other implementations are possible. One approach may be to use thick-film or thin-film printed resistors (on a ceramic substrate or on a hybrid with the active components mounted), because printed resistors have matched thermal coefficients of resistance. If necessary, the same resistors could be laser-trimmed or abrasive-trimmed by the board manufacturer to calibrate gain and offset. Another approach may be to use digitally-trimmed potentiometers to set the offset and gain. Although digitally-trimmed potentiometers typically have high end-to-end thermal coefficients of resistance, if used in the potentiometric mode, they tend to have well-matched thermal-coefficients of resistance, so the thermal effects may be low. Drawbacks to this approach include relatively high cost, low resolution, and relatively large size, but these are expected to improve in the future. Also, digitally-controlled digital-to-analog converters (DACs) could be used for the same purpose.

Circuit 600 has a variety of features. For example, circuit 600 can limit a variable input voltage to a predefined voltage (e.g., 5 Vdc). Reducing the voltage supplied to the voltage regulator reduces the amount of power dissipated by the voltage regulator, which reduces its internal temperature and, therefore, thermal effect (e.g., error generation). Also, this extends the input voltage range of the circuit and allows a higher voltage to be input than the voltage regulator can normally handle. Moreover, the regulated voltage may be supplied to a detector circuit (e.g., signal-conditioning circuit board 130). As another example, circuit 600 can supply two different output signals (e.g., one between 0–5 V and one between 0–10 V). Thus, circuit 600 can satisfy two operational constraints. As an additional example, circuit 600 can produce an output signal that is proportional with a 10%–90% 5V ratiometric signal without adding significant offset error, gain error, offset thermal error, or gain thermal error. For example, in particular implementations, changes to output values may be less than 0.40% of the input/output range within a temperature range of −20–85° C. Moreover, circuit 600 may be a fixed, precise transfer function with no trimming required on installation.

Figure 7:
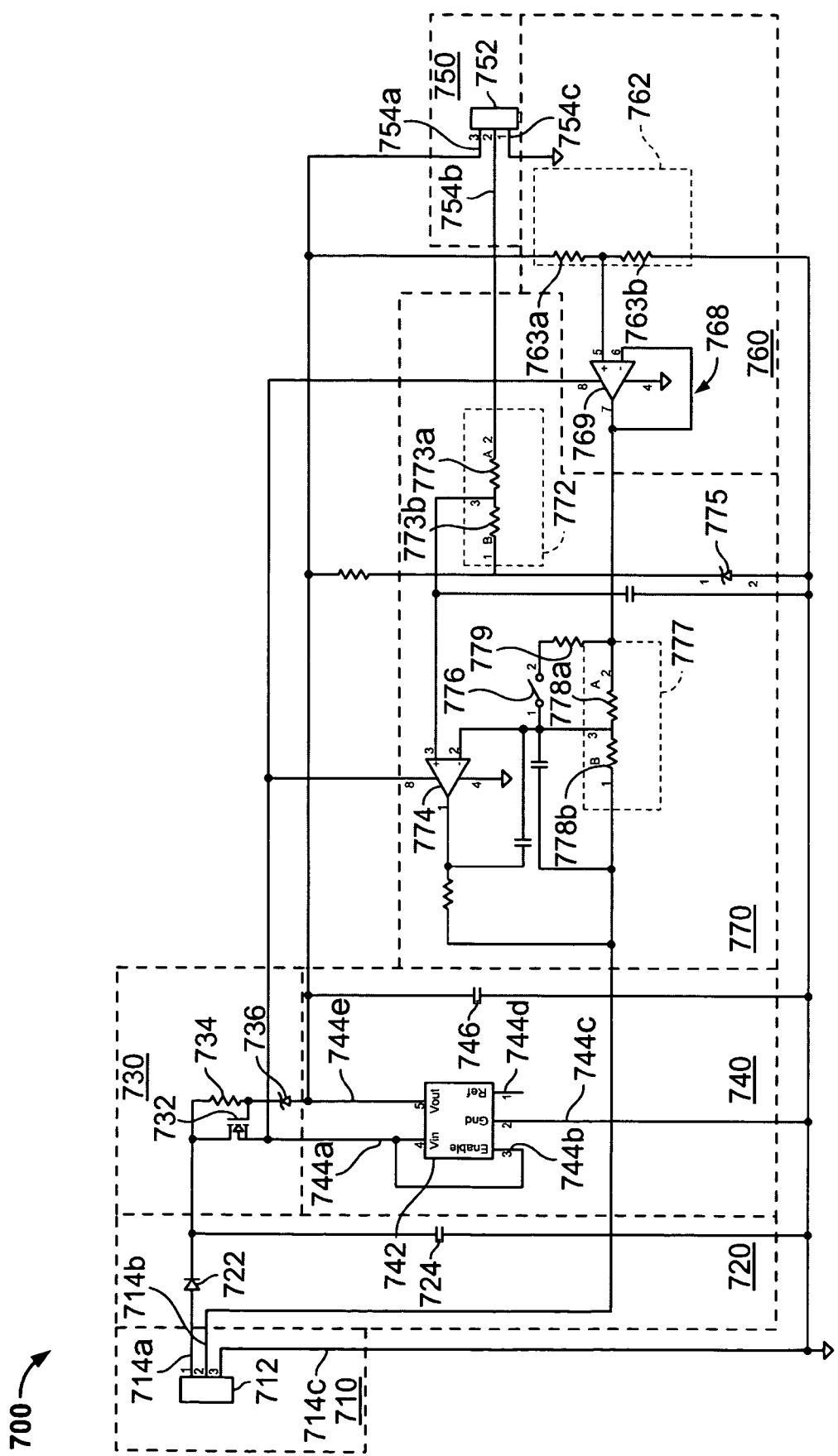
FIG. 7 is a schematic diagram showing one example of a signal-converting circuit.

FIG. 7 illustrates a pressure-converting circuit 700. Circuit 700 is one implementation of pressure-converting circuit 500. Circuit 700 may be part of signal-converting circuit board 150.

In general, circuit 700 includes an input/output coupler 710, a circuit protector 720, a voltage reducer 730, a voltage regulator 740, an input/output coupler 750, a signal biaser 760, and a signal span adjuster 770. These components may be similar to those for circuit 600. As discussed in more detail below, circuit 700 is designed to accept an unregulated voltage input from 9 to 36 Vdc, although it may operate at up to 50 Vdc under limited conditions. The circuit, however, can be readily modified to use other input voltage ranges (e.g., from 1 to 240 Vac or Vdc), with appropriate components. The circuit can also output a 1–5 Vdc signal or a 1–6 Vdc signal. In particular implementations, the circuit operates at 5 V, which may be supplied to other circuits, although other voltages (e.g., 4.096 V) are possible.

Input/output coupler 710 includes a connector 712 and conductors 714 (e.g., pins) that allow signals to be conveyed to and from circuit 700. In the illustrated implementation, an input supply voltage arrives on conductor 714a, and a common signal (e.g., ground) arrives on conductor 714c. Conductor 714b is used for conveying the converted pressure-representative signal from the circuit.

Circuit protector 720 is coupled to input/output coupler 710 and protects circuit 700 from improper signals, transient spikes, noise, and the like in the input supply voltage. In the illustrated implementation, circuit protector 720 includes a diode 722 and a capacitor 724. Diode 722 polarity protects the input supply voltage, and capacitor 724 decouples the input supply voltage.

To accommodate the voltage range of the input signal, voltage reducer 730 limits the input voltage to a predefined range (e.g., 0–5 V). The reduced voltage is conveyed to voltage regulator 740. Voltage reducer 730 includes a transistor 732, which can absorb the bulk of the voltage. Voltage reducer 730 also includes a resistor 734 and a diode 736. Resistor 734 provides bias current to diode 736, which in turn biases transistor 732 on. In certain implementations, transistor 732 is biased into linear operation. Transistor 732 may be biased on by resistor 734 and diode 736 until the input to voltage regulator 740 is less than a given value (e.g., 2V) above the output of the voltage regulator. In particular implementations, diode 736 keeps the gate of transistor 732 biased at about 10 Vdc, which keeps the input to voltage regulator 740 at about 8 V.

Voltage regulator 740 produces a regulated supply voltage based on the supply voltage from voltage reducer 730. Voltage regulator 740 includes a regulator 742 and a capacitor 746. In the illustrated implementation, regulator 742 has five input/output connectors 744. The reduced voltage is received through connector 744a and fed back through connector 744b. The regulated supply voltage, which may be quite steady, is provided to input/output coupler 750 through connector 744e, which is coupled to a circuit rail 702. Capacitor 746 provides stabilization and decoupling of the regulated output signal.

Input/output coupler 750 is coupled to voltage regulator 740 through rail 702 and includes connector 754 and conductors 754. Input/output coupler 750 provides the regulated supply voltage to a signal-conditioning circuit board through conductor 754a. This signal may excite that circuit board so that it may generate a signal representative of pressure. The pressure-representative signal is received through conductor 754b.

Signal biaser 760 is also coupled to rail 702 and includes a voltage divider 762 that divides the rail to provide a reference voltage for the output stage (e.g., signal span adjuster 770). This reference voltage is ratiometric to the rail. In doing so, voltage divider 762 sets the offset for the pressure-representative signal received through connector 754b of input/output coupler 750.

In this implementation, voltage divider 762 includes thermal-coefficient-matched resistors 763. In particular implementations, resistor 763a may have a resistance of 332K Ohms, and resistor 763b may have a resistance of 60.4K Ohms. Resistors 763 may be precise (e.g., 0.1% deviation and 25 ppm thermal drift), although they need not be.

Signal biaser 760 also includes a buffer 768, which buffers the offset voltage. Buffer 768 includes an operational amplifier 769. Operational amplifier 769 acts as a voltage-follower to buffer voltage divider 762.

Signal span adjuster 770 is coupled to coupler 750 and receives the pressure-representative signal received through conductor 754b. Signal span adjuster 770 scales the pressure-representative signal to the appropriate range (e.g., from 5V to 6 V). In the illustrated implementation, signal span adjuster 770 acts as a differential amplifier that compares the pressure-representative signal voltage to a stable reference voltage and provides precise differential gain with a single-ended (ground referenced) output voltage.

Signal span adjuster 770 includes a voltage divider 772, an operational amplifier 774, and a diode 775. Voltage divider 772 includes thermal-coefficient-matched resistors 773. In particular implementations, each of resistors 773 has a resistance of 150K Ohms. Diode 775 provides a bandgap voltage reference, which may allow a calibrated voltage to be maintained regardless of input current. Diode 775 may provide a 1.2 Vdc reference with low thermal error and good precision. In particular implementations, diode 775 is implemented as an integrated circuit that behaves as a perfect zener diode.

Signal span adjuster 770 also includes a switch 776, a voltage divider 777, and a resistor 779. The output of signal span adjuster 770 is fed back through voltage divider 777, which also receives the output of buffer 768. Voltage divider 777 includes thermal-coefficient-matched resistors 778. In particular implementations, each of resistors 778 has a resistance of 150K Ohms. Voltage divider 777 forces the voltage of operational amplifier 774 to follow a non-zero voltage offset that when combined with the span adjustment, places the output at 1 V when the input is at 0.5V.

In one mode of operation, circuit 700 produces a 1–5 V output signal when switch 776 is open. With the voltage signal received through conductor 754b at 0.5 Vdc, voltage divider 772, with 150K Ohm resistors, sets the non-inverting input of operational amplifier 774 to 0.8625 Vdc. Resistor 779 biases diode 775 on. The output of operational amplifier 769 is a buffered voltage set by voltage divider 762 from rail 702, which is at +5 V. The buffered voltage is therefore 0.77 Vdc, with resistor 763a having a resistance of 332K Ohms and resistor 763b having a resistance of 60.3 Ohms. The output formula may be expressed as follows:

$V\text{out} = (1.225V - (1.225 - V\text{in})/(R773a + R773b)^* R773b) + (((1.225V - (1.225V - V\text{in})/(R773a + R773b)^* R773b) - 0.77)/R778a^* R778b).$ For the mentioned implementation, this translates to:

$$Vout=(1.225V-(1.225-Vin)/(150+150)*150)+\\(((1.225V-(1.225V-Vin)/(150+150)*150)-\\0.77)/150*150)$$

Thus, with the input to voltage divider 772 at 0.5 Vdc (at zero pressure), the output of operational amplifier 774 will be 0.955 Vdc. This deviation can be altered (e.g., with a second switch), but in certain implementations, a fixed offset adjustment is considered acceptable. With the input at 4.5 Vdc, voltage divider 772 sets the non-inverting input of operational amplifier 774 to 2.8625 V. Therefore, the output of operational amplifier 774 will be 2.8625V+(2.8625 Vdc−0.77 Vdc), or 4.955 Vdc (for a span of 4.000 Vdc).

To change the circuit for a 1–6 Vdc output, switch 776 is closed. Closing switch 776 changes the ratio of voltage divider 777 and causes signal span adjuster 770 to increase the span of the signal by 20%. The offset voltages may be optimized for this gain. The parallel combination of resistor 778a and resistor 779 is 100K Ohms (i.e., (300*150)/(300+150)). For the following formulas, this will be expressed as resistor 778a'. Now, the output formula may be expressed as:

$$Vout=(1.225V-(1.225-Vin)/(R773a+R773b)*\\R773b)+(((1.225V-(1.22\ 5V-in)/(R773a+\\R773b)*R773b)-0.77)/R778a'*R778b)$$

With the mentioned implementation, this produces:

$$Vout=(1.225V-(1.225-Vin)/(150+150)*150)+\\(((1.225V-(1.225V-Vin)/(150+150)*150)-\\0.77)/100*150);$$

Vout=1.001 Vdc with Vin=0.5 Vdc; and

Vout=6.001 Vdc with Vin=4.5 Vdc.

Circuit 700, therefore, may convert a ratiometric input voltage from an external device (e.g., signal-conditioning circuit board 130) to an output of 1–5 Vdc or 1–6 Vdc.

Circuit 700 has a variety of features. For example, circuit 700 can limit a variable input voltage to a predefined voltage (e.g., 5 Vdc). Reducing the voltage supplied to the voltage regulator reduces the amount of power dissipated by the voltage regulator, which reduces its internal temperature and, therefore, thermal effect (e.g., error generation). Also, this extends the input voltage range of the circuit and allows a higher voltage to be input than the voltage regulator can normally handle. Moreover, the regulated voltage may be supplied to a detector circuit (e.g., signal-conditioning circuit board 130). As another example, circuit 700 can supply two different output signals (e.g., one between 1–5 V and one between 1–6 V). Thus, circuit 700 can satisfy two operational constraints. As an additional example, circuit 700 can signal condition a 10%–90% 5V ratiometric signal without adding significant offset error, gain error, or thermal offset or gain errors. Moreover, circuit 700 may be a fixed, precise transfer function with no trimming required on installation.

Figure 8:
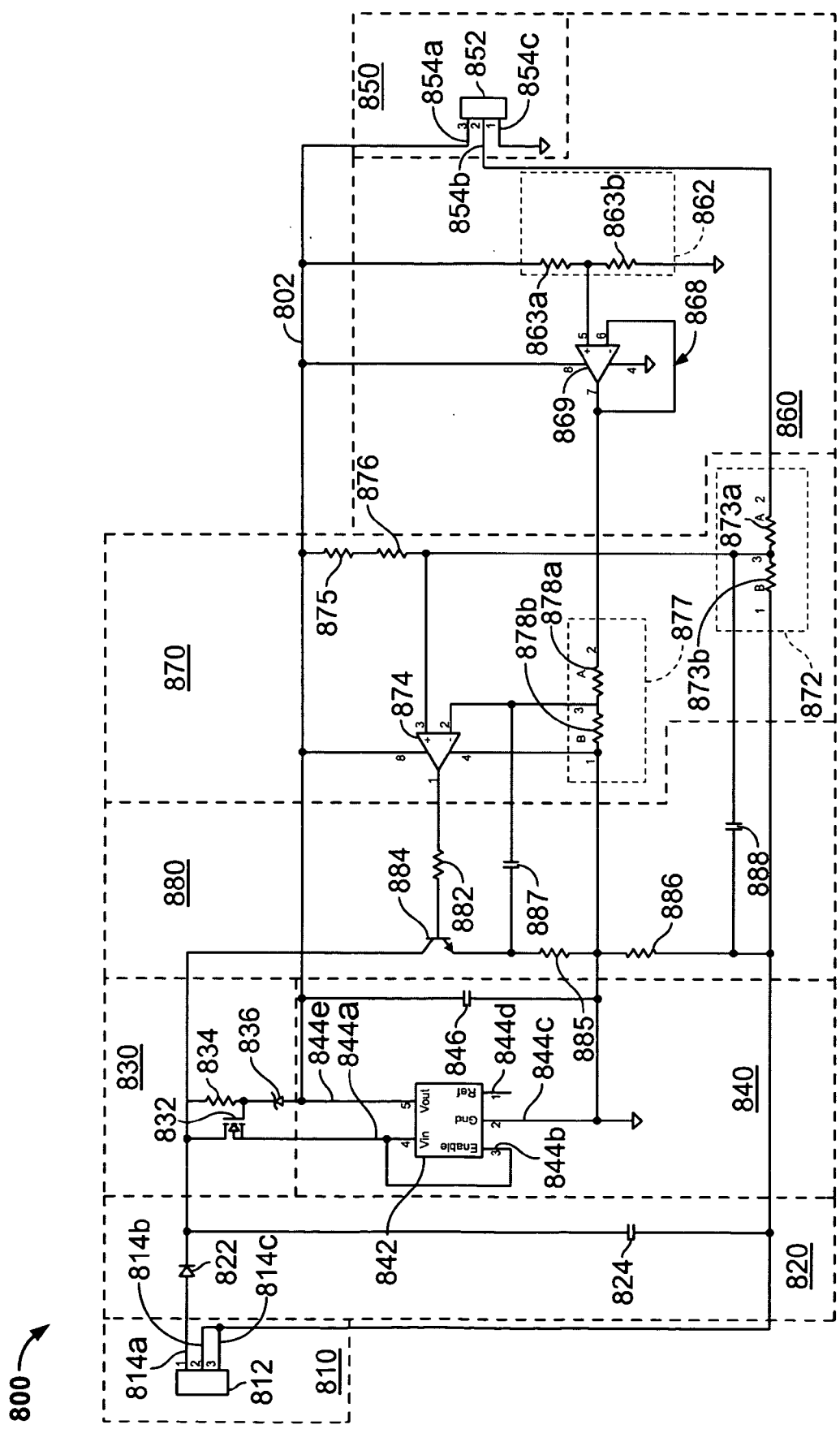
FIG. 8 is a schematic diagram showing one example of a signal-converting circuit.

FIG. 8 illustrates a pressure-converting circuit 800. Circuit 800 is one implementation of pressure-converting circuit 500. Circuit 800 may be part of signal-converting circuit board 150.

In general, circuit 800 includes an input/output coupler 810, a circuit protector 820, a voltage reducer 830, a voltage regulator 840, an input/output coupler 850, a signal biaser 860, and a signal span adjuster 870. These components may be similar to those for circuit 600. Circuit 800 also includes a signal format converter 880. As discussed in more detail below, circuit 800 is designed to accept an unregulated voltage input from 9 to 36 Vdc, although it may operate at up to 50 Vdc under limited conditions. The circuit, however, can be readily modified to use other input voltage ranges (e.g., from 1 to 240 Vac or Vdc), with appropriate components. The circuit can also output a 4–20 mA signal, which can be drawn through the voltage input. In particular implementations, the circuit operates at 5 V, which may be supplied to other circuits, although other voltages (e.g., 4.096 V) are possible.

Input/output coupler 810 includes a connector 812 and conductors 814 (e.g., pins) that allow signals to be conveyed to and from circuit 800. In the illustrated implementation, an input supply voltage arrives on conductor 814a, and a common signal (e.g., ground) arrives on conductor 814b, to which conductor 814c is tied. Conductor 814 is used for conveying the converted pressure-representative signal from the circuit.

Circuit protector 820 is coupled to input/output coupler 810 and protects circuit 800 from improper signals, transient spikes, noise, and the like in the input supply voltage. In the illustrated implementation, circuit protector 820 includes a diode 822 and a capacitor 824. Diode 822 polarity protects the input supply voltage, and capacitor 824 decouples the input supply voltage.

To accommodate the voltage range of the input signal, voltage reducer 830 limits the input voltage to a predefined range (e.g., 0–5 V). The reduced voltage is conveyed to voltage regulator 840. Voltage reducer 830 includes a transistor 832, which can absorb the bulk of the voltage. Voltage reducer 830 also includes a resistor 834 and a diode 836. Resistor 834 provides bias current to diode 836, which in turn biases transistor 832 on. In certain implementations, transistor 832 is biased into linear operation. Transistor 832 may be biased on by resistor 834 and diode 836 until the input to voltage regulator 840 is less than a given value (e.g., 2V) above the output of the voltage regulator. In particular implementations, diode 836 keeps the gate of transistor 832 biased at about 10 Vdc, which keeps the input to voltage regulator 840 at about 8 V.

Voltage regulator 840 produces a regulated supply voltage based on the supply voltage from voltage reducer 830. Voltage regulator 840 includes a regulator 842 and a capacitor 846. In the illustrated implementation, regulator 842 has five input/output connectors 844. The reduced supply voltage is received through connector 844a and fed back through connector 844b. The regulated supply voltage, which may be quite steady, is provided to input/output coupler 850 through connector 844e, which is coupled to a circuit rail 802. Capacitor 846 provides stabilization and decoupling of the regulated output signal.

Input/output coupler 850 is coupled to voltage regulator 840 through rail 802 and includes connector 852 and conductors 854. Input/output coupler 850 provides the regulated supply voltage to a signal-conditioning circuit board through conductor 854a. This signal may excite that circuit board so that it may generate a signal representative of pressure. The pressure-representative signal is received through conductor 854b.

Signal biaser 860 is also coupled to rail 802 and includes a voltage divider 862 that divides the rail to provide a reference voltage for the transconductance stage (e.g., signal span adjuster 870 and signal format converter 880). This reference voltage is ratiometric to the rail. In doing so, voltage divider 862 sets the offset for the pressure-representative signal received through connector 854b of input/output coupler 850.

In this implementation, voltage divider 862 includes thermal-coefficient-matched resistors 863. In particular implementations, resistor 863a may have a resistance of 200K Ohms, and resistor 863b may have a resistance of 300K Ohms. Resistors 863 may be precise (e.g., 0.1% deviation and 25 ppm thermal drift), although they need not be.

Signal biaser 860 also includes a buffer 868, which buffers the offset voltage. Buffer 868 includes an operational amplifier 869. Operational amplifier 869 acts as a voltage-follower to buffer voltage divider 862.

Signal span adjuster 870 is coupled to coupler 850 and receives the pressure-representative signal received through conductor 854b. Signal span adjuster 870 scales the pressure-representative signal to the appropriate range (e.g., from 4 mA to 16 mA). In the illustrated implementation, signal span adjuster 870 acts as a differential amplifier that compares the pressure-representative signal voltage to a stable reference voltage and provides precise differential gain with a single-ended (ground referenced) output voltage.

Signal span adjuster 870 includes a voltage divider 872, an operational amplifier 874, a resistor 875, and a resistor 876. Voltage divider 872 includes thermal-coefficient-matched resistors 873. In particular implementations, resistor 873a has a resistance of 100K Ohms, and resistor 873b has a resistance of 20K Ohms. Resistor 875 and resistor 876 are coupled to rail 802 and facilitate supplying a minimum output current. In particular implementations, resistor 875 may have a resistance of 1.91K Ohms, and resistor 876 may have a resistance of 127K Ohms. In certain implementations, resistor 876 may be precision resistor, which may mask non-precision of resistor 875.

Signal span adjuster 870 also includes a voltage divider 877. The output of signal format converter 880 is fed back through voltage divider 877, which also receives the output of buffer 868. Thus, the output of operational amplifier 869 is divided by voltage divider 877 and summed to the inverting input of operational amplifier 874. Voltage divider 877 includes thermal-coefficient-matched resistors 878. In particular implementations, resistor 878a has a resistance of 100 K Ohms, and resistor 878b has a resistance of 20K Ohms. Voltage divider 877 forces the voltage of operational amplifier 874 to follow a non-zero voltage offset that when combined with the span adjustment, placing the output at 1 V when the input is at 0.5V.

Signal format converter 880 is coupled to signal span adjuster 870. Signal format converter 880 includes a resistor 882, a transistor 884, a resistor 885, and a resistor 886. Resistor 882 limits current to the base of transistor 884, resistor 885 is a current limiting resistor to limit the maximum output signal, and resistor 886 operates as a current sense resistor. That is, resistor 886 is the current-sensing feedback element. The voltage across resistor 886 is proportional to the total circuit current, which is the output signal itself, and the voltage is fed back to operational amplifier 874. The performance accuracy of circuit 600 is also affected by the resistor 886. Operational amplifier 874 provides a differential gain to develop a voltage across resistor 886, by driving transistor 884, which may be an NPN power transistor, to induce a controlled current into the common signal. In particular implementations, resistor 882 has a resistance of 4.99K Ohms, resistor 884 has a resistance of 10 Ohms, and resistor 886 has a resistance of 50 Ohms. In certain implementations, resistor 886 may be implemented as a pair of parallel resistors, which may reduce variability.

Signal format converter 880 also includes a capacitor 887 and a capacitor 888. Capacitor 887 stabilizes operational amplifier 874 by reducing gain at higher frequencies. Capacitor 888 rolls off the frequency response of circuit 800. In particular implementations, capacitor 887 has a capacitance of 0.01 µF, and capacitor 888 has a capacitance of 0.1 µF.

In one mode of operation, the output of operational amplifier 869 is divided by voltage divider 877 and summed to the inverting input of operational amplifier 874 to set the inverting input to the operational amplifier to 0.5 Vdc. Thus, with the input at voltage divider 872 at 0.5 Vdc (at zero pressure), no current flows through voltage divider. Resistor 875 and resistor 876, however, drive enough current into resistor 873b to induce a 4 mA total current draw, which is accomplished by operational amplifier 874 biasing transistor 884 on enough to maintain an input balance at 0.5 Vdc. As the input voltage is raised to 4.5 Vdc, operational amplifier 874, transistor 882, and resistor 886 cooperate to maintain the non-inverting input at 0.5 Vdc. At full scale, input signal at 4.5 Vdc, this equates to dropping 4 Vdc (4.5 Vdc–0.5 Vdc) across resistor 873b, which produces 20 mA if resistor 873b has a resistance of 20K Ohms.

Circuit 800, therefore, may convert a ratiometric input voltage from an external device (e.g., signal-conditioning circuit board 130) to an output of 4–20 mA.

Circuit 800 has a variety of features. For example, circuit 800 can limit a variable input voltage to a predefined voltage (e.g., 5 Vdc). Reducing the voltage supplied to the voltage regulator reduces the amount of power dissipated by the voltage regulator, which reduces its internal temperature and, therefore, thermal effect (e.g., error generation). Also, this extends the input voltage range of the circuit and allows a higher voltage to be input than the voltage regulator can normally handle. Moreover, the regulated voltage may be supplied to a detector circuit (e.g., signal-conditioning circuit board 130).

As another example, the circuit may have low thermal self-heating of a 4–20 mA output, due to intrinsically low thermal-coefficients by design. 4–20 mA devices by nature create heat, which causes self-heating errors in pressure sensor assemblies. As the design of these assemblies get smaller, this problem typically worsens. But with circuit 800, the heat generated may have little effect on itself because only low-thermal effect components are used. The benefit is that the whole assembly has low self-heating effect, and it is easier to keep the heat from the heat-sensitive parts (e.g., the signal-conditioning circuit and the pressure detector).

As an additional example, circuit 800 may convert the format of a signal, which assists in meeting operational constraints. As a further example, circuit 800 can signal condition a 10%–90% 5V ratiometric signal without adding significant offset error, gain error, or thermal offset or gain errors. Moreover, circuit 800 may be a fixed, precise transfer function with no trimming required on installation.

Figure 9:
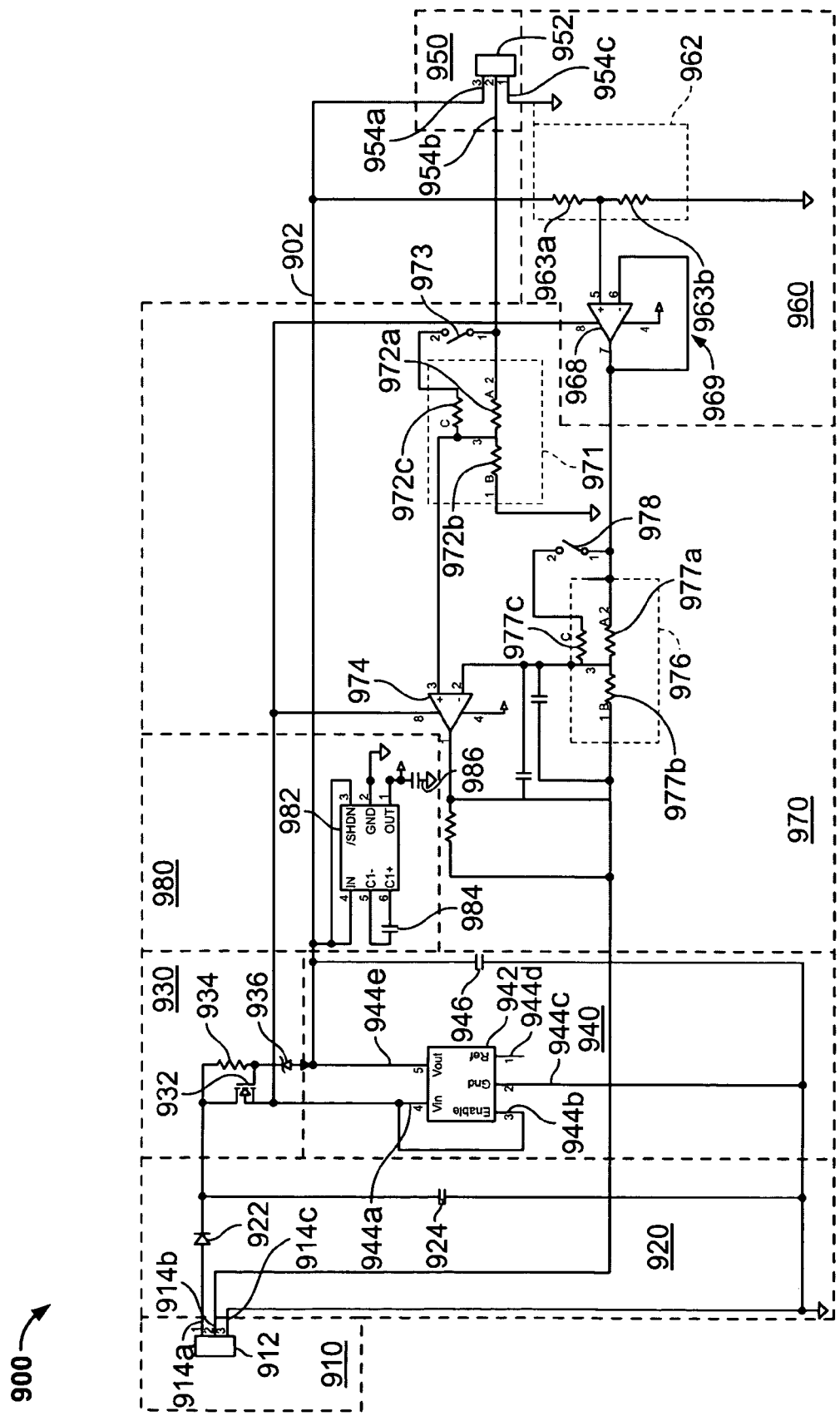
FIG. 9 is a schematic diagram showing one example of a signal-converting circuit.

FIG. 9 illustrates a pressure-converting circuit 900. Circuit 900 is one implementation of pressure-converting circuit 500. Circuit 900 may be part of signal-converting circuit board 150.

In general, circuit 900 includes an input/output coupler 910, a circuit protector 920, a voltage reducer 930, a voltage regulator 940, an input/output coupler 950, a signal biaser 960, and a signal span adjuster 970. As discussed in more detail below, circuit 900 is designed to accept an unregulated voltage input from 9 to 36 Vdc, although it may operate at up to 50 Vdc under limited conditions. The circuit, however, can be readily modified to use other input voltage ranges (e.g., from 1 to 240 Vac or Vdc), with appropriate components. The circuit can also output a 0–5 Vdc signal or a 0–10 Vdc signal. In particular implementations, the circuit operates at 5 V, although other voltages (e.g., 4.096 V) are possible.

Input/output coupler 910 includes a connector 912 and conductors 914 (e.g., pins) that allow signals to be conveyed to and from circuit 900. In the illustrated implementation, an input supply voltage arrives on conductor 914*a*, and a common signal (e.g., ground) arrives on conductor 914*c*. Conductor 914*b* is used for conveying the converted pressure-representative signal from the circuit.

Circuit protector 920 is coupled to coupler 910 and protects circuit 900 from improper signals, transient spikes, noise, and the like in the input supply voltage. In the illustrated implementation, circuit protector 920 includes a diode 922 and a capacitor 924. Diode 922 polarity protects the input supply voltage, and capacitor 924 decouples the input supply voltage.

To accommodate the voltage range of the input signal, voltage reducer 930 limits the input voltage to a predefined range (e.g., 0–5 V). The reduced voltage is conveyed to voltage regulator 940. Voltage reducer 930 includes a transistor 932, which can absorb the bulk of the voltage. Voltage reducer 930 also includes a resistor 934 and a diode 936. Resistor 934 provides bias current to diode 936, which in turn biases transistor 932 on. In certain implementations, transistor 932 is biased into linear operation. Transistor 932 may be biased on by resistor 934 and diode 936 until the input to voltage regulator 940 is less than a given value (e.g., 2 V) above the output of the voltage regulator. In particular implementations, diode 936 keeps the gate of transistor 932 biased at about 10 Vdc, which keeps the input to voltage regulator 940 at about 8 V.

Voltage regulator 940 produces a regulated supply voltage based on the supply voltage from voltage reducer 930. Voltage regulator 940 includes a regulator 942 and a capacitor 946. In the illustrated implementation, regulator 942 has five input/output connectors 944. The reduced voltage is received through connector 944*a* and fed back through connector 944*b*. The regulated supply voltage, which may be quite steady, is provided to input/output coupler 950 through connector 944*e*, which is coupled to a circuit rail 902. Capacitor 946 provides stabilization and decoupling of the output signal.

Input/output coupler 950 is coupled to voltage regulator 940 through rail 902 and includes connector 952 and conductors 954. Input/output coupler 950 provides the regulated voltage to a signal-conditioning circuit board through conductor 954*a*. This signal may excite that circuit board so that is may generate a signal representative of pressure. The pressure-representative signal is received through conductor 954*b*. In particular implementations, the pressure-representative signal is expected to be linear over 10% to 90% of the span (e.g., 0.5–4.5 V) for a 0–5 V signal.

Signal biaser 960 is also coupled to rail 902 and includes a voltage divider 962 that divides the rail to provide a reference voltage for the output stage (e.g., signal span adjuster 970). This reference voltage is ratiometric to the rail. In doing so, voltage divider 962 sets the offset for the pressure-representative signal received through connector 954*b* of input/output coupler 950.

In this implementation, voltage divider 962 includes thermal-coefficient-matched resistors 963. In particular implementations, resistor 963*a* may have a resistance of 100K Ohms, and resistor 963*b* may have a resistance of 11K Ohms. Resistors 963 may be precise (e.g., 0.1% deviation and 25 ppm thermal drift), although they need not be.

Signal biaser 960 additionally includes a buffer 968, which buffers the offset voltage. Buffer 968 includes an operational amplifier 969. Operational amplifier 969 acts as a voltage-follower to buffer voltage divider 962.

Signal span adjuster 970 is coupled to coupler 950 and receives the pressure-representative signal received through conductor 954*b*. Signal span adjuster 970 scales the pressure-representative signal to the appropriate range (e.g., from 5V to 10 V). In the illustrated implementation, signal span adjuster 970 acts as a differential amplifier that compares the pressure-representative signal voltage to a stable reference voltage and provides precise differential gain with a single-ended (ground referenced) output voltage.

Signal span adjuster 970 includes a voltage divider 971, a switch 973, and an operational amplifier 974. Voltage divider 971 includes thermal-coefficient-matched resistors 972. In particular implementations, resistor 972*a* has a resistance of 40K Ohms, resistor 972*b* has a resistance of 50K Ohms, and resistor 972*c* has a resistance of 40K Ohms.

The output of signal span adjuster 970 is fed back through another voltage divider 976, which also receives the output of buffer 968. Voltage divider 976 includes thermal-coefficient-matched resistors 977. In particular implementations, resistor 977*a* has a resistance of 40K Ohms, resistor 977*b* has a resistance of 50K Ohms, and resistor 977*c* has a resistance of 40K Ohms. Voltage divider 976 forces the voltage of operational amplifier 974 to follow a non-zero voltage offset that when combined with the span adjustment, places the output at 0 V when the input is at 0.5V.

Signal span adjuster 970 also includes a switch 978. In particular implementations, switch 973 and switch 978 allow gain to be modified in a balanced way on the differential and feedback sides.

In one mode of operation, circuit 900 produces a 0–5 V output signal when switch 973 and switch 978 are open. With the voltage signal received through conductor 954*b* at 0.5 Vdc, voltage divider 971, with the previously mentioned resistances, sets the non-inverting input of operational amplifier 974 to 0.5 Vdc. The output of operational amplifier 969 is a buffered voltage set by voltage divider 962 from rail 902, which is at +5 V. The buffered voltage is then 0.5 Vdc, which results in the differential between Vin and Voffset being 0 Vdc when the pressure-representative signal is at 0.5 Vdc. The output is the gain multiplied times the difference between the Vin and Voffset voltage.

Assuming that voltage dividers 971 and 976 use matched resistance values, the output may be expressed as follows:

$$V\text{out}=(V\text{in}-V\text{offset})*(R977b/R977a)).$$

Thus, for the mentioned implementation:

$$V\text{out}=(V\text{in}-0.5\ \text{Vdc})*(50/40);$$

Vout=0.000 Vdc with Vin=0.5 Vdc; and

Vout=5.000 Vdc with Vin=4.5 Vdc.

To change circuit 900 for a 0–10 Vdc output, switch 973 and switch 978 are closed. Placing resistor 972*c* in parallel with resistor 972*a* changes the ratio of voltage divider 971 from 50/40 to 50/20. The same is true for voltage divider 976. Therefore, the output may be expressed as:

$$V\text{out}=(V\text{in}-V\text{offset})*(R977b/R977a'))$$

Thus, for the mentioned implementation:

Vout=(Vin−0.5 Vdc)*(50/20);

Vout=0.000 Vdc with Vin=0.5 Vdc; and

Vout=10.000 Vdc with Vin=4.5 Vdc.

Circuit 900, therefore, may convert a ratiometric input voltage from an external device (e.g., signal-conditioning circuit board 130) to an output of 0–5 Vdc or 0–10 Vdc.

In order for operational amplifier 974 to swing to (or through) zero volts, it may be necessary to generate a slightly negative internal supply rail. This may be achieved with voltage regulator 980. Voltage regulator 980 includes regulator a 982 and a capacitor 984, which produce the negative voltage. Regulator 982 may, for example, be a charge-pump voltage inverter. A capacitor 986 filters the resultant −5 Vdc.

Circuit 900 has a variety of features. For example, circuit 900 can limit a variable input voltage to a predefined voltage (e.g., 5 Vdc). Reducing the voltage supplied to the voltage regulator reduces the amount of power dissipated by the voltage regulator, which reduces its internal temperature and, therefore, thermal effect (e.g., error generation). Also, this extends the input voltage range of the circuit and allows a higher voltage to be input than the voltage regulator can normally handle. Moreover, the regulated voltage may be supplied to a detector circuit (e.g., signal-conditioning circuit board 130). As another example, circuit 900 can supply two different output signals (e.g., one between 0–5 V and one between 0–10 V). Thus, circuit 900 can satisfy two operational constraints. As an additional example, circuit 900 can produce an output signal that is proportional with a 10%–90% 5V ratiometric signal without adding significant offset error, gain error, or thermal offset or gain errors. Moreover, circuit 900 may be a fixed, precise transfer function with no trimming required on installation. Also, this implementation may provide a balanced differential stage that has desirable characteristics such as enhanced common-mode rejection and, therefore, should be more immune to electromagnetic interference (EMI) and/or radio-frequency interference (RFI).

Figure 10:
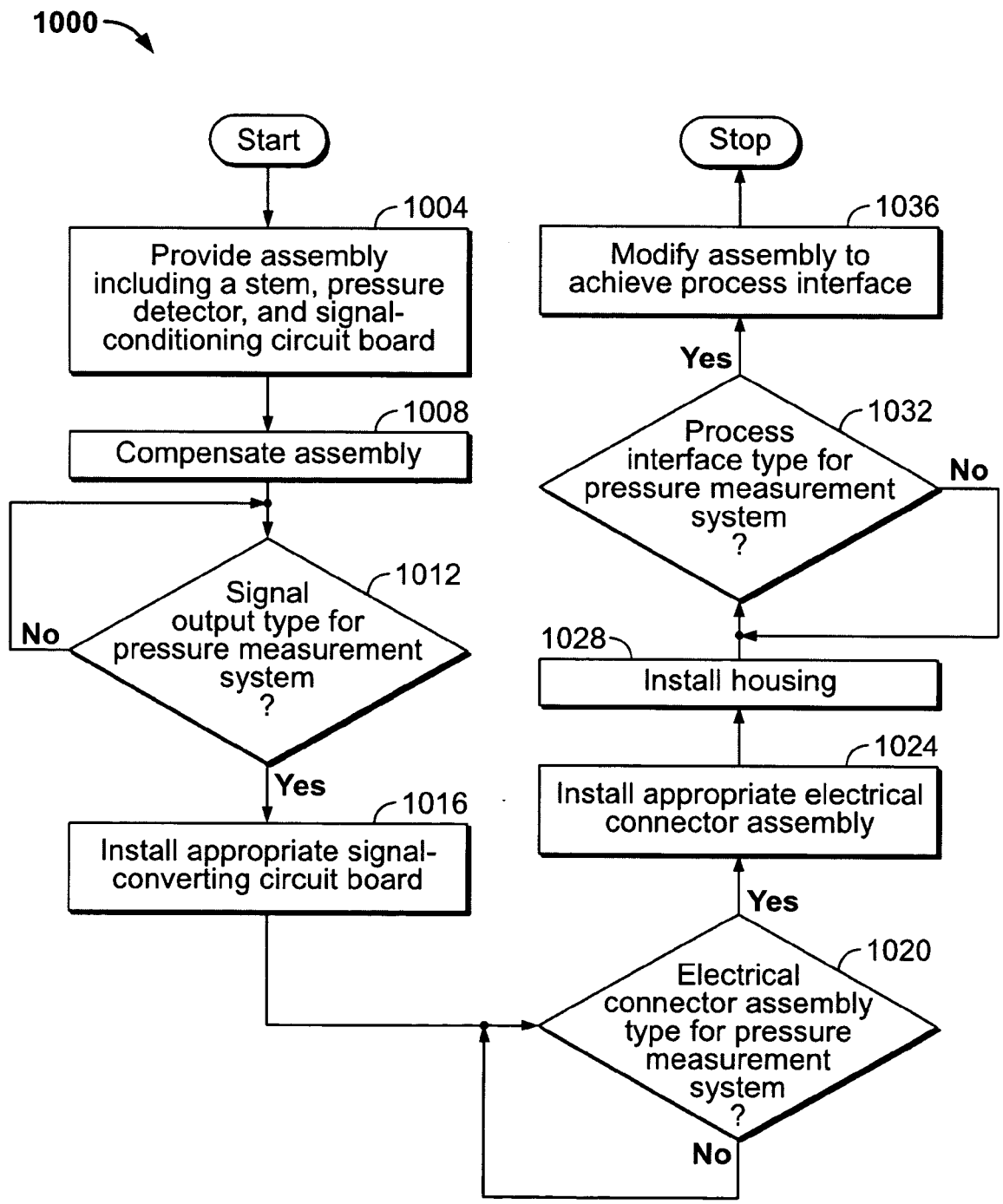
FIG. 10 is a flow chart illustrating one example of a process for manufacturing a pressure measurement system.

FIG. 10 illustrates a process 1000 for pressure measurement. Process 1000 may, for example, represent a process for manufacturing pressure measurement system 100.

Process 1000 begins with providing an assembly including a stem, a pressure detector, and a signal-conditioning circuit board (operation 1004). In particular implementations, the stem may be part of a socket, the pressure detector may be a metallic diaphragm having strain gauges coupled thereto, and the circuit board may amplify a signal representative of pressure from the pressure detector. Providing the assembly may include acquiring the assembly or assembling the components of the assembly. The pressure detector may be coupled to the stem, and the circuit board may be electrically coupled to the pressure detector.

Upon obtaining the assembly, the assembly is compensated (operation 1008). In particular implementations, the assembly is compensated for a pressure range (e.g., 0–100 psi, 0–500 psi, or 0–1,000 psi) and a temperature range (0–100° C., 5–35° C., or −20–85° C. Typically, an assembly is usable over various pressure and temperature ranges. Calibrating the assembly can include determining the deviation of the output of the assembly from an expected output and compensating the output of the assembly for the deviation.

The process continues with determining a signal output type for the pressure measurement system that will include the assembly (operation 1012). Determining a signal output type may, for example, include determining an external device to which the pressure measurement system may be coupled. Upon determining the signal output type for the pressure measurement system, the process calls for installing a circuit board that produces the output signal without materially affecting the calibration (operation 1016). This circuit board may, for example, convert an electrical signal from the signal-conditioning circuit board to another type of signal (e.g., 0.5–4.5 V to 4–20 mA). To avoid affecting the calibration, the circuit board may consume low amounts of power and be precise. Installing the signal-converting circuit board may, for example, be accomplished by engaging the circuit board with a housing for the signal-conditioning circuit board and electrically coupling the circuit boards.

The process continues with determining an electrical connector assembly type for the pressure measurement system that will include the assembly (operation 1020). Determining an electrical connector assembly type may, for example, include determining an external device to which the pressure measurement system may be coupled. Upon determining the electrical connector assembly type for the pressure measurement system, an appropriate electrical connector assembly is installed (operation 1024). This electrical connector assembly may be adapted to convey the signal output to an external device. For instance, the assembly may convert a first pin arrangement to a second pin arrangement (e.g., from linear to triangular). Installing the electrical connector may, for example, be accomplished by engaging the connector with a housing for the signal-conditioning circuit board and electrically coupling the connector to the signal-converting circuit board.

The process continues with installing a housing (operation 1028). The housing may be composed of any appropriate material and may have any appropriate shape for interfacing with a remote device. In particular implementations, the housing may be dictated by the type of electrical connector assembly. Installing the housing may include coupling the housing to the stem. The housing, in conjunction with the stem, may enclose the pressure detector, the signal-conditioning circuit board, and the signal converting circuit board.

Process 1000 continues with determining a process interface type for the pressure measurement system that will include the assembly (operation 1032). Determining a process interface type may, for example, include determining a process to which the assembly may be coupled. Upon determining the process interface type, the assembly may be modified to achieve the pressure interface (operation 1036). Modifying the assembly may, for example, include machining a socket of which the stem is a part to include a process interface (e.g., screw threads) or coupling the stem to a socket that includes the process interface.

Although FIG. 10 describes one implementation of a process for pressure measurement, other implementations may include fewer, additional, and/or a different arrangement of operations. For example, modifying the assembly to achieve the process interface may occur before or after installing the signal-converting circuit board, installing the electrical connector assembly, and/or installing the housing. Moreover, in particular implementations, it may not be performed at all—for instance, if the stem already has a process interface. As another example, the determinations may be performed in any order. Moreover, two or more determinations may be made contemporaneously. As an additional example, a process may not call for determining n electrical connector assembly type or a process interface type. As a further example, a signal-converting circuit board may not be installed if the output from the signal-conditioning circuit board is already appropriate.

Figure 11:
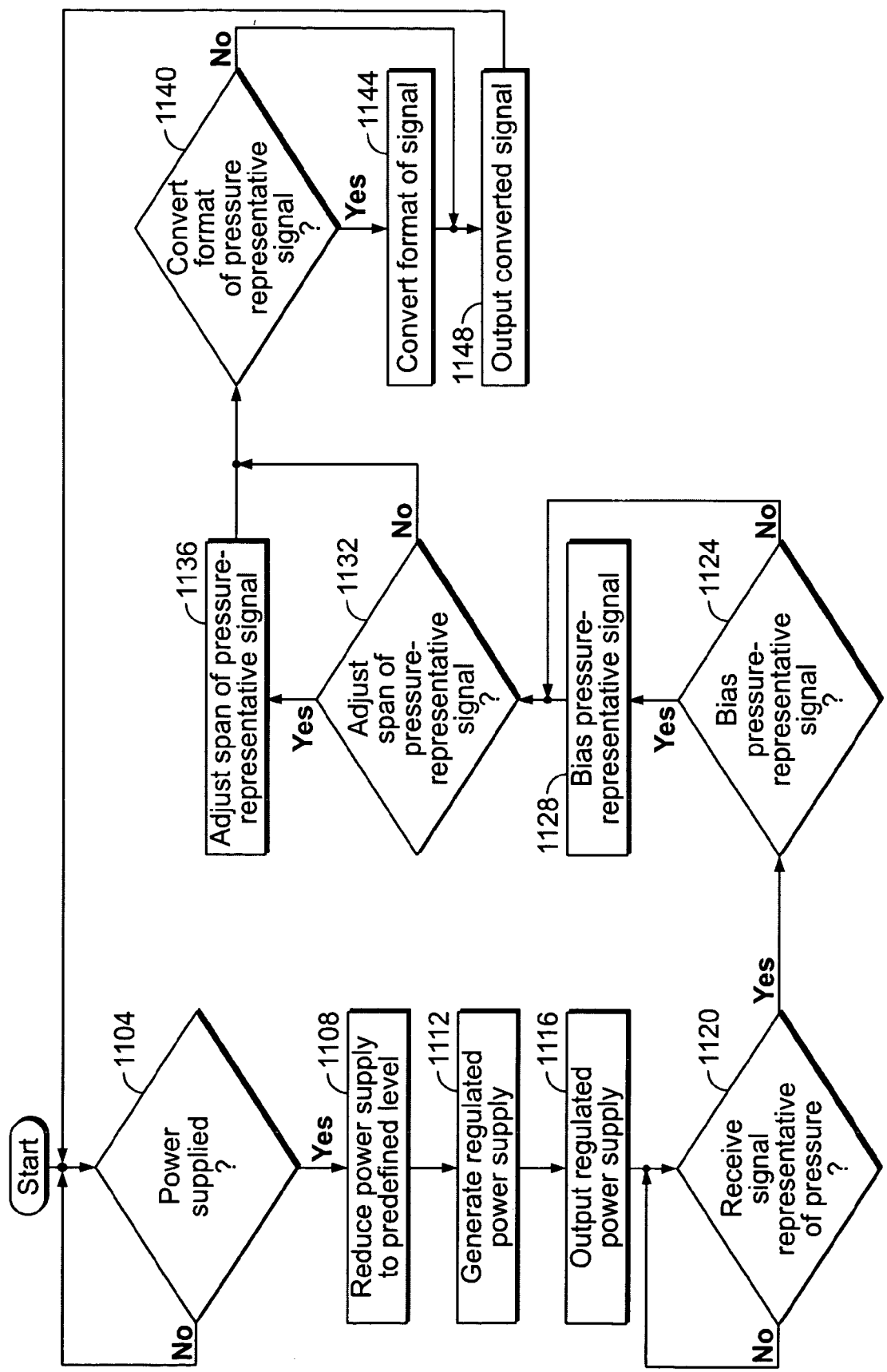
FIG. 11 is a flow chart illustrating one example of a process for operating a pressure measurement system.

FIG. 11 illustrates a process 1100 for pressure measurement. Process 1100 may, for example, represent the operations of pressure measurement system 100.

Process 1100 begins with waiting for power to be supplied (operation 1104). The power may be supplied from a local or remote source. Once power is supplied, the process calls for reducing the supply power to a predefined level (operation 1108). In particular implementations, for example, a 9–36 Vdc signal may be reduced to a 0–5 Vdc signal. The process then calls for generating a regulated supply power (operation 1112). The regulated supply power may, for example, use the same voltage range as the reduced supply power.

The process continues with outputting the regulated supply power (operation 1116). The regulated supply power may, for example, be conveyed to a signal-conditioning circuit board, for which the signal may excite the circuit board. The process then calls for waiting to receive a signal representative of pressure (operation 1120).

Once a pressure-representative signal has been received, the process call for determining whether the signal should be biased (operation 1124). Determining whether to bias the signal may, for example, be based on the type of signal to be output or on a pre-selected switch location. If the pressure-representative signal should be biased, the signal is biased (operation 1128).

Once the pressure-representative signal has been biased, or if the pressure-representative signal should not be biased, the process call for determining whether the span of the signal should be adjusted (operation 1132). Determining whether the span should be adjusted may, for example, be based on the type of signal to be output or on a pre-selected switch location. If the span of the pressure-representative signal should be adjusted, the span of the signal is adjusted (operation 1136).

Once the span of the pressure-representative signal has been adjusted, or if the span of the pressure-representative signal should not be adjusted, the process call for determining whether the format of the pressure-representative signal should be converted (operation 1140). Determining whether the format of the signal should be converted may, for example, be based on the type of signal to be output or on a pre-selected switch location. If the format of the pressure-representative signal should be converted, the format of the signal is converted (operation 1144).

Once the format of the pressure-representative signal has been converted, or if the format of the pressure-representative signal should not be converted, the process call for outputting the converted pressure-representative signal (operation 1148). The process then calls for returning to wait for a supply of power.

Although FIG. 11 illustrates one implementation of a process for pressure measurement, other implementations may include fewer, additional, and/or a different arrangement of operations. For example, the supply power may not be reduced and/or a regulated supply power may not be generated, especially if the supplied power is well-regulated. As another example, a pressure-representative signal my not be biased, span-adjusted, and/or format-adjusted, depending on the differences between the pressure-representative signal and the converted pressure-representative signal. For instance, if a pressure-representative signal only needs to be biased, span adjusting and format adjusting operations may be deleted. As a further example, the pressure-representative signal may be biased after the span is adjusted, or the format of the signal may be adjusted before applying either the bias or span adjustment. As an additional example, the regulated supply power may be provided to components of a circuit implementing process 1100. As another example, various operations may have selectable characteristics. For instance, signal biasing may be able to bias a signal by two or more amounts, and signal span adjusting may be able to scale a signal by two or more amounts. As a further example, the determinations regarding the pressure-representative signal may not have to be performed—for instance, when the pressure-representative signal and the converted pressure-representative signal are consistent.

A number of implementations have been described, and various others have been mentioned or suggested. Moreover, various additions, deletions, substitutions, and/or modifications may be made while still achieve pressure measurement. For these reasons, the invention is to be measured by the scope of the appended claims, which may contain one or more of the implementations.

The invention claimed is:

1. A system for pressure measurement, the system comprising:
a signal-converting circuit, the circuit comprising:
a coupler, the coupler operable to receive a pressure-representative signal, the signal comprising a span;
a signal biaser, the signal biaser comprising a thermally-insensitive voltage divider that facilitates biasing the pressure-representative signal; and
a signal span adjuster coupled to the coupler and the signal biaser, the signal span adjuster comprising a thermally-insensitive voltage divider that facilitates adjusting the span of the pressure-representative signal.

2. The system of claim 1, further comprising a signal format converter coupled to the signal span adjuster, the signal format converter operable to transform the format of the pressure-representative signal to another format.

3. The system of claim 2, wherein the signal format converter transforms a voltage signal to a current signal.

4. The system of claim 1, further comprising:
a power reducer, the power reducer operable to reduce the power of a supply power; and
a power regulator coupled to the power reducer, the power regulator operable to generate a regulated supply power.

5. The system of claim 4, wherein the power regulator is coupled to the signal biaser and the signal span adjuster to provide the regulated supply power thereto.

6. The system of claim 4, wherein the power regulator is coupled to the coupler, and the coupler is operable to convey the regulated supply power outside of the circuit.

7. The system of claim 4, further comprising a second coupler, the second coupler coupled to the power reducer and the signal span adjuster and operable to receive the supply power and to convey the converted pressure-representative signal.

8. The system of claim 4, wherein the power reducer comprises a transistor operable to absorb power.

9. The system of claim 8, wherein the transistor is biased on until the input to the power regulator is less than a predefined value above the regulated supply power.

10. The system of claim 1, wherein a thermally-insensitive voltage divider comprises a thermally-matched resistive divider.

11. The system of claim 1, wherein the signal biaser is operable to change the applied bias that it applies.

12. The system of claim 1, wherein the signal span adjuster is operable to change the signal span adjustment that it applies.

13. The system of claim 12, wherein the signal span adjuster operates as a normal amplifier in one mode and a differential amplifier in another mode.

14. A method for pressure measurement, the method comprising:
    receiving a pressure-representative signal, the signal comprising a span;
    biasing the pressure-representative signal using a thermally-insensitive voltage divider;
    adjusting the span of the pressure-representative signal using a thermally-insensitive voltage divider; and
    conveying the converted pressure-representative signal.

15. The method of claim 14, further comprising converting the format of the pressure-representative signal to another format.

16. The method of claim 14, further comprising:
    receiving a supply power;
    reducing the power of the supply power; and
    generating a regulated supply power based on the reduced supply power.

17. The method of claim 16, wherein reducing the supply power comprises biasing a power-absorbing transistor until an input to a power regulator generating the regulated supply power is less than a predefined value above the regulated supply power.

18. The method of claim 14, wherein biasing the pressure-representative signal using a thermally-insensitive voltage divider comprises using a thermally-matched resistive divider.

19. The method of claim 14, further comprising selectively changing the applied signal bias.

20. The method of claim 14, further comprising selectively changing the applied signal span adjustment.

21. The method of claim 20, wherein adjusting the signal span is accomplished by a normal amplifier in one mode and a differential amplifier in another mode.

22. A system for pressure measurement, the system comprising:
    a signal-converting circuit, the circuit comprising:
        a first coupler, the first coupler operable to receive a supply power and to convey a converted pressure-representative signal;
        a power reducer coupled to the first coupler, the power reducer operable to reduce the power of the supply power, the power reducer comprising a power-absorbing transistor that is biased on until the input to a power regulator is less than a predefined value above the output of a power regulator;
        the power regulator, the power regulator coupled to the power reducer and operable to generate a regulated supply power;
        a second coupler, the second coupler coupled to the power regulator to receive the regulated supply power, the second coupler operable to convey the regulated supply power outside the circuit and to receive a pressure-representative signal, the signal comprising a span;
        a signal biaser, the signal biaser coupled to the power regulator to receive the regulated supply power and comprising a thermally-matched resistive divider that facilitates biasing the pressure-representative signal, the signal biaser operable to change the applied bias that it applies;
        a signal span adjuster coupled to the second coupler, to receive the pressure-representative signal, the power regulator, to receive the regulated supply power, and the signal biaser, the signal span adjuster comprising a thermally-matched resistive divider that facilitates adjusting the span of the pressure-representative signal, the signal span adjuster operable to change the signal span adjustment that it applies by operating as a normal amplifier in one mode and a differential amplifier in another mode; and
        a signal format converter coupled to the power regulator, to receive the regulated supply power, the signal span adjuster, and the first coupler, the signal format converter operable to transform the format of the pressure-representative signal to another format and to convey the converted pressure-representative signal to the first coupler.

* * * * *

UNITED STATES PATENT AND TRADEMARK OFFICE
CERTIFICATE OF CORRECTION

| | | |
|---|---|---|
| PATENT NO. | : 7,100,455 B2 | Page 1 of 1 |
| APPLICATION NO. | : 10/928645 | |
| DATED | : September 5, 2006 | |
| INVENTOR(S) | : David F. LePine and Yoshikazu Kaneko | |

It is certified that error appears in the above-identified patent and that said Letters Patent is hereby corrected as shown below:

In column 23, line 62 – after "(0-100° C., 5-35° C., or -20-85° C" insert --)--

In column 25, line 1 – replace "n" with -- an --

In column 26, line 67 – delete "applied"

In column 28, line 21 – delete "applied"

Signed and Sealed this

Eighteenth Day of December, 2007

JON W. DUDAS
*Director of the United States Patent and Trademark Office*